United States Patent
Anand et al.

(10) Patent No.: US 12,321,866 B2
(45) Date of Patent: Jun. 3, 2025

(54) DATA DIVERSITY VISUALIZATION AND QUANTIFICATION FOR MACHINE LEARNING MODELS

(71) Applicant: GE Precision Healthcare LLC, Milwaukee, WI (US)

(72) Inventors: Deepa Anand, Bangalore (IN); Rakesh Mullick, Bangalore (IN); Dattesh Dayanand Shanbhag, Bengaluru (IN); Marc T Edgar, Glenmont, NY (US)

(73) Assignee: GE Precision Healthcare LLC, Waukesha, WI (US)

(*) Notice: Subject to any disclaimer, the term of this patent is extended or adjusted under 35 U.S.C. 154(b) by 1072 days.

(21) Appl. No.: 17/243,046

(22) Filed: Apr. 28, 2021

(65) Prior Publication Data

US 2022/0351055 A1  Nov. 3, 2022

(51) Int. Cl.
*G06N 5/04* (2023.01)
*G06N 20/00* (2019.01)

(52) U.S. Cl.
CPC .............. *G06N 5/04* (2013.01); *G06N 20/00* (2019.01)

(58) Field of Classification Search
CPC .......... G06N 5/04; G06N 20/00; G06N 3/048; G06N 3/088
See application file for complete search history.

(56) References Cited

U.S. PATENT DOCUMENTS

| | | | | |
|---|---|---|---|---|
| 2018/0356949 A1* | 12/2018 | Wang | .................. | G06N 7/01 |
| 2019/0102692 A1* | 4/2019 | Kwant | .................. | G06F 18/2411 |
| 2020/0112571 A1* | 4/2020 | Koral | .................. | G06N 3/08 |
| 2020/0351283 A1 | 11/2020 | Salunke | | |
| 2021/0272654 A1* | 9/2021 | Thaker | .................. | G01N 15/1433 |
| 2021/0336973 A1* | 10/2021 | Leiderfarb | .......... | H04L 63/145 |
| 2022/0179891 A1* | 6/2022 | Ceze | .................. | G16B 30/10 |

(Continued)

FOREIGN PATENT DOCUMENTS

| | | |
|---|---|---|
| CN | 111382807 B | 9/2020 |
| CN | 112306494 A | 2/2021 |

OTHER PUBLICATIONS

Van Der Maaten L. et al. | Visualizing Data using t-SNE. Journal of Machine Learning Research 9, 2008, pp. 2579-2605.

(Continued)

*Primary Examiner* — Tan H Tran
(74) *Attorney, Agent, or Firm* — Amin, Turocy & Watson, LLP

(57) ABSTRACT

Systems and techniques that facilitate data diversity visualization and/or quantification for machine learning models are provided. In various embodiments, a processor can access a first dataset and a second dataset, where a machine learning (ML) model is trained on the first dataset. In various instances, the processor can obtain a first set of latent activations generated by the ML model based on the first dataset, and a second set of latent activations generated by the ML model based on the second dataset. In various aspects, the processor can generate a first set of compressed data points based on the first set of latent activations, and a second set of compressed data points based on the second set of latent activations, via dimensionality reduction. In various instances, a diversity component can compute a diversity score based on the first set of compressed data points and second set of compressed data points.

20 Claims, 18 Drawing Sheets

(56) References Cited

U.S. PATENT DOCUMENTS

2024/0071626 A1* 2/2024 Liu ..................... G16H 10/60
2024/0100763 A1* 3/2024 Ohshita ................ G06N 3/08

OTHER PUBLICATIONS

Mcinnes L., et al. | UMAP: Uniform Manifold Approximation and Projection for Dimension Reduction. Sep. 21, 2020, 63 pages. arXiv preprint arXiv:1802.03426.
Lmcinnes/UMAP | License, https://github.com/lmcinnes/umap/blob/master/LICENSE.txt, last accessed on Apr. 7, 2021.
Miljkovic D. | Review of Novelty Detection Methods. MIn The 33rd International Convention MPIRO 2010/CTS, 6 pages.
International Application No. PCT/US2022/025938 filed Apr. 22, 2022—International Search Report and Written Opinion issued on Aug. 1, 2023; 7 pages.

* cited by examiner

DATA DIVERSITY VISUALIZATION AND QUANTIFICATION FOR MACHINE LEARNING MODELS

TECHNICAL FIELD

The subject disclosure relates generally to machine learning models, and more specifically to techniques for visualizing and/or quantifying diversity in data analyzed by machine learning models.

BACKGROUND

The performance of a machine learning model depends upon the data on which the machine learning model is trained, the data on which the machine learning model is tested/validated, and/or the data which the machine learning model encounters when deployed in the field. For example, the performance of a trained machine learning model can be positively impacted if the machine learning model is further trained on data that significantly varies from the original training data. In contrast, the performance of the machine learning model can be negatively impacted if the machine learning model is further trained on data that does not significantly vary from the original training data. As another example, when deployed in the field, a trained machine learning model can accurately analyze data that is substantially similar to the original training data. In contrast, when deployed in the field, the machine learning model can inaccurately analyze data that is not substantially similar to the original training data. Therefore, being able to quickly and/or accurately determine whether two different machine learning datasets are similar to each other and/or vary from each other can be advantageous. Unfortunately, there are no conventional tools that facilitate rapid manual and/or automatic comparison of different machine learning datasets.

Accordingly, systems and/or techniques that can address this technical problem can be desirable.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that facilitate data diversity visualization and/or quantification for machine learning models are described.

According to one or more embodiments, a system is provided. The system can comprise a computer-readable memory that can store computer-executable components. The system can further comprise a processor that can be operably coupled to the computer-readable memory and that can execute the computer-executable components stored in the computer-readable memory. In various embodiments, the computer-executable components can comprise a receiver component. In various cases, the receiver component can access a first set of data candidates and a second set of data candidates, wherein a machine learning model is trained on the first set of data candidates. In various aspects, the computer-executable components can further comprise an activation component. In various cases, the activation component can obtain a first set of latent activations generated by the machine learning model based on the first set of data candidates, and can obtain a second set of latent activations generated by the machine learning model based on the second set of data candidates. In various instances, the computer-executable components can further comprise a compression component. In various cases, the compression component can generate a first set of compressed data points by applying a dimensionality reduction technique to the first set of latent activations, and can generate a second set of compressed data points by applying the dimensionality reduction technique to the second set of latent activations. In various aspects, the computer-executable components can further comprise a diversity component. In various cases, the diversity component can compute a diversity score based on the first set of compressed data points and the second set of compressed data points.

According to one or more embodiments, the above-described system can be implemented as a computer-implemented method and/or a computer program product.

DETAILED DESCRIPTION

Figure 1:
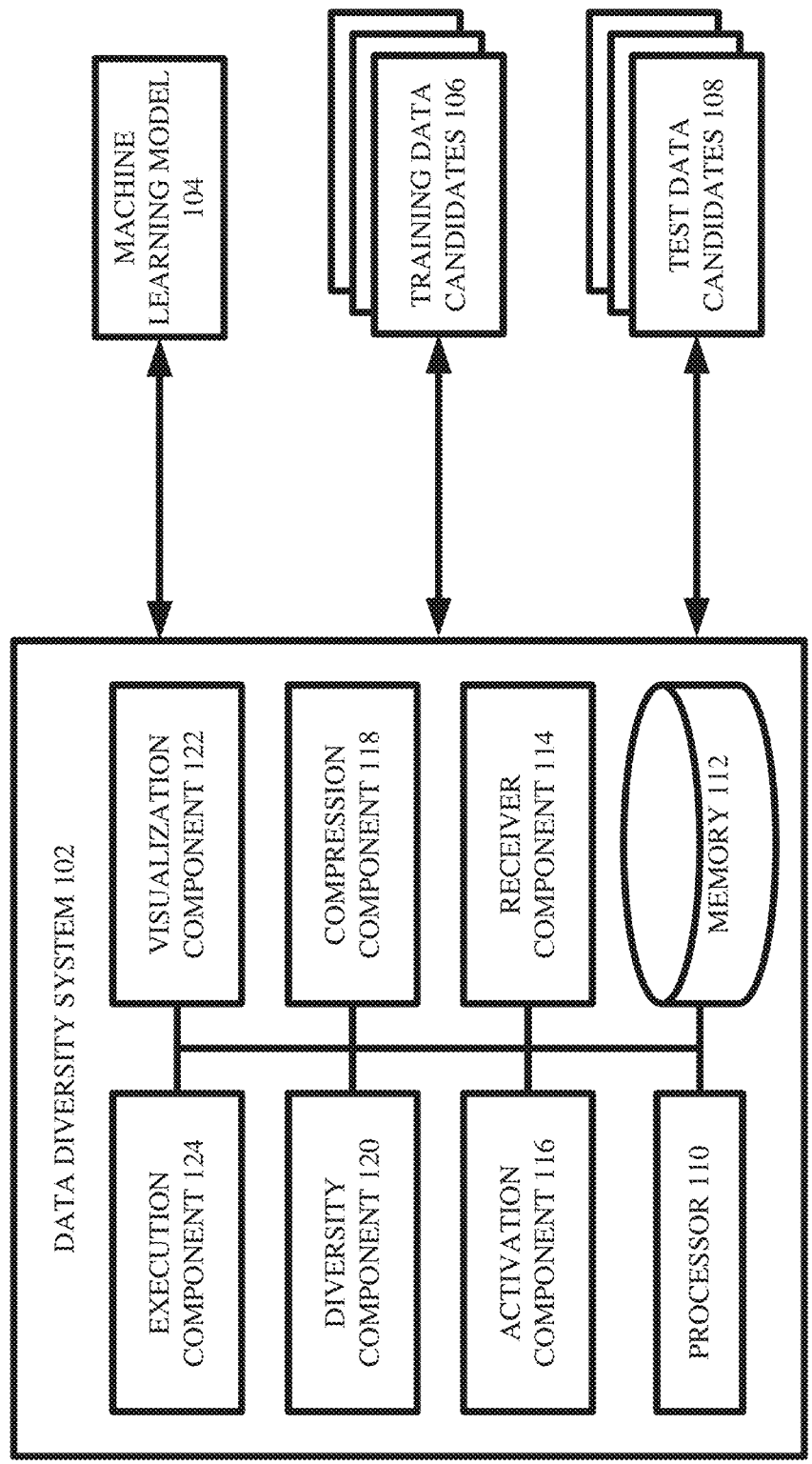
FIG. 1 illustrates a block diagram of an example, non-limiting system that facilitates visualization and/or quantification of data diversity for machine learning models in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

As mentioned above, the performance (e.g., output accuracy, output precision) of a machine learning model (e.g., an artificial neural network) can depend upon the data on which the machine learning model is trained, the data on which the machine learning model is tested/validated, and/or the data which the machine learning model encounters when deployed in the field. For example, the performance of a trained machine learning model can be improved if the machine learning model is further trained on data that exhibits patterns/distributions that significantly vary from the patterns/distributions exhibited by the original training data. In contrast, the performance of the machine learning model can be negatively impacted if the machine learning model is further trained on data that exhibits patterns/distributions that do not significantly vary from the patterns/distributions exhibited by the original training data. In other words, additional training on redundant and/or duplicative data can cause overfitting, which can decrease the generalizability of the machine learning model. As another example, when deployed in the field, a trained machine learning model can accurately analyze data that exhibits patterns/distributions that are substantially similar to the patterns/distributions exhibited by the original training data. In contrast, when deployed in the field, the machine learning model can inaccurately analyze data that exhibits patterns/distributions that are not substantially similar to the patterns/distributions exhibited by the original training data. In other words, the machine learning model can perform poorly on data that is unlike the data on which the machine learning model was trained.

Therefore, being able to quickly compare the patterns/distributions exhibited by two different machine learning datasets (e.g., datasets which are analyzable by and/or otherwise receivable as input by a machine learning model) can allow for appropriate actions to be taken and/or decisions to be made by model developers. Unfortunately, conventional techniques do not facilitate rapid and/or objective comparisons between the patterns/distributions exhibited by two different machine learning datasets.

For example, suppose that a developer is deciding whether to further train an already-trained machine learning model on a particular dataset. As explained above, if the patterns/distributions exhibited by the particular dataset are sufficiently different from those exhibited by the dataset on which the machine learning model was already trained, further training on the particular dataset can be beneficial (e.g., overfitting can be avoided since the two datasets are not redundant and/or duplicative). However, if the patterns/distributions exhibited by the particular dataset are instead insufficiently different from those exhibited by the dataset on which the machine learning model was already trained, further training on the particular dataset can be detrimental (e.g., overfitting can occur since the two datasets are redundant and/or duplicative). Conventional techniques do not offer any tools which allow the developer to quickly and/or robustly determine whether the patterns/distributions of the particular dataset are sufficiently different from those of the training dataset. So, the developer has no rigorous and/or objective way of determining whether the machine learning model should be further trained on the particular dataset.

As another example, suppose that a developer is deciding whether a data augmentation strategy (e.g., modality-based augmentations, biology-based augmentations, mathematical transformation-based augmentations) is appropriate with respect to a machine learning model. In such case, the developer can create an augmented dataset by applying the augmentation strategy to an original dataset on which the machine learning model was trained. From a model development perspective, the augmentation strategy can be appropriate for the machine learning model if the augmented dataset "fills in the learning gaps" of the machine learning model. In other words, the augmentation strategy can be appropriate for the machine learning model if the patterns/distributions exhibited by the augmented dataset are sufficiently different from those exhibited by the original dataset, such that the machine learning model tends to inaccurately analyze the augmented dataset prior to any training on the augmented dataset. On the other hand, the augmentation strategy can be inappropriate for the machine learning model if the patterns/distributions exhibited by the augmented dataset are insufficiently different from the original dataset, such that the machine learning model tends to accurately analyze the augmented dataset prior to any training on the augmented dataset. Conventional techniques do not offer any tools which allow the developer to quickly and/or robustly compare the patterns/distributions of the augmented dataset with those of the original dataset. So, the developer has no rigorous and/or objective way of determining whether the augmentation strategy is appropriate with respect to the machine learning model.

As yet another example, suppose that a developer is deciding whether to automatically annotate and/or curate a particular dataset via a machine learning model that was trained on an original dataset, or to instead manually annotate and/or curate the particular dataset. If the patterns/distributions exhibited by the particular dataset are sufficiently similar to those exhibited by the original dataset, automatic annotation/curation by the machine learning model can be appropriate. On the other hand, if the patterns/distributions exhibited by the particular dataset are not sufficiently similar to those exhibited by the original dataset, automatic annotation/curation by the machine learning model can be inappropriate, meaning that manual annotation/curation can be needed. Conventional techniques do not offer any tools which allow the developer to quickly and/or robustly determine whether the patterns/distributions of the particular dataset are sufficiently similar to those of the original dataset. So, the developer has no rigorous and/or objective way of determining whether automatic annotation/curation would be appropriate.

Various embodiments of the subject innovation can address one or more of these technical problems. One or more embodiments described herein include systems, computer-implemented methods, apparatus, and/or computer program products that can facilitate data diversity visualization and/or quantification for machine learning models. In various instances, embodiments of the subject innovation can be considered as a computerized tool (e.g., a combination of computer-executable hardware and/or computer-executable software) that can electronically access a first dataset and a second dataset, where a machine learning model has been trained on the first dataset, and can electronically quantify how different and/or diverse the second dataset is as compared to the first dataset, from the perspective of the machine learning model. In other words, the computerized tool can electronically compute a diversity score, which diversity score can indicate how differently the machine learning model tends to interpret the patterns/distributions exhibited by the second dataset as compared to how the machine learning model tends to interpret the patterns/distributions exhibited by the first dataset. Moreover, in various aspects, the computerized tool can electronically render visualizations (e.g., graphs, plots) that visually illustrate such differently-interpreted patterns/distributions. Accordingly, a model developer can take any suitable action and/or make any suitable decision with respect to the machine learning model, based on such quantification and/or visualization (e.g., can decide to initiate and/or forego additional training of the machine learning model on the second dataset based on the quantification and/or visualization; can decide to initiate automatic and/or manual annotation/curation of the second dataset based on the quantification and/or visualization). That is, in various embodiments, the computerized tool described herein can be considered as a computerized user interface which can be leveraged by the model developer, so as to allow the model developer to make more informed and/or objective design choices with respect to the machine learning model.

In various embodiments, such a computerized tool can comprise a receiver component, an activation component, a compression component, a diversity component, a visualization component, and/or an execution component.

In various embodiments, a machine learning model can comprise any suitable artificial neural network architecture. For instance, the machine learning model can include any suitable number of layers, can include any suitable numbers of neurons in various layers (e.g., different layers can have different numbers of neurons), can implement any suitable activation functions (e.g., softmax, hyperbolic tangent, sigmoid), and/or can implement any suitable inter-neuron connectivity patterns (e.g., forward connections, skip connections, recursive connections).

In various aspects, the machine learning model can be trained (e.g., via supervised training, unsupervised training, and/or reinforcement learning) to receive as input a data candidate and to produce some output based on the data candidate. In various cases, the data candidate can exhibit any suitable dimensionality and/or format (e.g., can be one or more scalars, one or more vectors, one or more matrices, one or more tensors, one or more strings, and/or any suitable combination thereof). Similarly, in various cases, the output can exhibit any suitable dimensionality and/or format (e.g., can be one or more scalars, one or more vectors, one or more matrices, one or more tensors, one or more strings, and/or any suitable combination thereof). As a non-limiting example, a data candidate can be a medical image of a patient (e.g., an X-ray image of a patient's knee, an MRI image of a patient's brain), and the output can be a label that classifies the medical image (e.g., that indicates the presence and/or absence of a particular anatomical structure in the medical image).

In various embodiments, there can be a first set of data candidates and a second set of data candidates. In various cases, the first set of data candidates can comprise any suitable number of data candidates. Likewise, the second set of data candidates can comprise any suitable number of data candidates (e.g., same number and/or different number as the first set of data candidates). In various instances, the machine learning model can have been trained (e.g., via supervised training, unsupervised training, and/or reinforcement learning) on the first set of data candidates. In some aspects, the second set of data candidates can represent data candidates obtained from a different source than the first set of data candidates, and a developer associated with the machine learning model can desire to determine whether the machine learning model can be expected to accurately analyze the data candidates from that different source and/or whether the machine learning model should be further trained (e.g., via backpropagation) on data candidates from that different source. In other aspects, the second set of data candidates can have been created by applying an augmentation strategy to the first set of data candidates, and the developer can desire to determine whether such augmentation strategy is appropriate to improve the generalizability of the machine learning model. In still other aspects, the second set of data candidates can be unannotated, and the developer can desire to determine whether automatic annotation techniques can be accurately applied to the second set of data candidates. As explained herein, the computerized tool can analyze the first set of data candidates and the second set of data candidates, and such analysis can be leveraged by the developer to objectively and/or rigorously make such determinations.

In various embodiments, the receiver component of the computerized tool can electronically receive and/or otherwise electronically access the machine learning model, the first set of data candidates, and/or the second set of data candidates. In various cases, the receiver component can electronically retrieve the machine learning model, the first set of data candidates, and/or the second set of data candidates from any suitable centralized and/or decentralized data structure (e.g., graph data structure, relational data structure, hybrid data structure), whether remote from and/or local to the receiver component. Accordingly, other components of the computerized tool described herein can electronically interact with the machine learning model, the first set of data candidates, and/or the second set of data candidates.

In various embodiments, the activation component of the computerized tool can electronically obtain a first set of latent activations and a second set of latent activations. In various aspects, the first set of latent activations can be generated by the machine learning model based on the first set of data candidates. Likewise, in various instances, the second set of latent activations can be generated by the machine learning model based on the second set of data candidates. For example, in various aspects, the activation component can electronically feed as input a particular data candidate from the first set of data candidates to the machine learning model. In various cases, a hidden layer of the machine learning model can generate a particular latent activation map based on the particular data candidate. Thus, a latent activation map can be obtained for each data candidate in the first set of data candidates, thereby resulting in the first set of latent activations. Similarly, in various aspects, the activation component can electronically feed as input a certain data candidate from the second set of data candidates to the machine learning model. In various cases, the hidden layer of the machine learning model can generate a certain latent activation map based on the certain data candidate. So, a latent activation map can be obtained for each data candidate in the second set of data candidates, thereby resulting in the second set of latent activations.

In various embodiments, the compression component of the computerized tool can electronically generate a first set of compressed data points based on the first set of latent activations. Likewise, in various cases, the compression component can electronically generate a second set of compressed data points based on the second set of latent activations. In various instances, the compression component can generate such sets of compressed data points via application of any suitable dimensionality reduction technique, such as t-distributed stochastic neighbor embedding (t-SNE) and/or uniform manifold approximation and projection (UMAP). For example, in various aspects, the compression component can electronically apply the dimensionality reduction technique to the first set of latent activations, thereby converting and/or transforming the first set of latent activations into the first set of compressed data points. A given latent activation map in the first set of latent activations can correspond to a given compressed data point in the first set of compressed data points, such that the given compressed data point that represents the given latent activation map but includes fewer dimensions (e.g., fewer numerical elements) than the given latent activation map. Similarly, in various aspects, the compression component can electronically apply the dimensionality reduction technique to the second set of latent activations, thereby converting and/or transforming the second set of latent activations into the second set of compressed data points. A given latent activation map in the second set of latent activations can correspond to a given compressed data point in the second set of compressed data points, such that the given compressed data point that represents the given latent activation map but includes fewer dimensions (e.g., fewer numerical elements) than the given latent activation map.

As mentioned above, a data candidate can, in various embodiments, have any suitable dimensionality (e.g., can be one or more scalars, one or more vectors, one or more matrices, one or more tensors, one or more strings, and/or any suitable combination thereof). Similarly, in various instances, a latent activation map can have any suitable dimensionality depending upon the configuration and/or structure of machine learning model. In various aspects, a compressed data point can have any suitable dimensionality that is lesser than the dimensionality of a latent activation map. As a non-limiting example, a latent activation map can be a matrix of hundreds and/or thousands of activation values outputted by a hidden layer of the machine learning model, and a compressed data point can be a two-element tuple (e.g., a two-element vector) that represents a corresponding latent activation map. As another non-limiting example, a latent activation map can be a matrix of hundreds and/or thousands of activation values outputted by a hidden layer of the machine learning model, and a compressed data point can be a fifty-element tuple (e.g., a fifty-element vector) that represents a corresponding latent activation map. More generally, a compressed data point can be an n-element tuple (e.g., an n-element vector), for any suitable positive integer n, where n is less than the number of elements in a latent activation map. Because a compressed data point can have a lower dimensionality than a latent activation map, it can be easier to perform computations on a compressed data point than on a latent activation map.

In various aspects, because the machine learning model can be trained on the first set of data candidates, the machine learning model can accurately analyze the patterns/distributions exhibited by the first set of data candidates. Such accurate analysis of the patterns/distributions exhibited by the first set of data candidates can ultimately cause the first set of compressed data points to be clustered according to the outputs which the machine learning model is configured/trained to produce. For example, suppose that the machine learning model is configured/trained to produce as output a binary label which indicates that an inputted data candidate is a member of one out of two classes. In such case, the first set of compressed data points can form two clusters: one cluster of compressed data points representing data candidates which the machine learning model infers belong to the first class, and another cluster of compressed data points representing data candidates which the machine learning model infers belong to the second class. More generally, if the machine learning model is configured/trained to classify a data candidate into one out of m classes, for any suitable positive integer m, the first set of compressed data points can be arranged into m clusters. In various cases, a cluster of compressed data points can be recognized as multiple compressed data points that have similar elements (e.g., that are separated by small and/or short Euclidean distances).

In various embodiments, the diversity component of the computerized tool can electronically compute a diversity score based on the first set of compressed data points and/or based on the second set of compressed data points. In other words, the diversity component can implement any suitable statistical techniques and/or statistical calculations (e.g., mean, medium, mode, standard deviation, variance) in order to mathematically quantify statistical differences between the first set of compressed data points and the second set of compressed data points. In various cases, the diversity score can be a scalar (and/or, in other cases, a vector, a matrix, and/or a tensor) that indicates such statistical differences between the first set of compressed data points and the second set of compressed data points.

In various instances, the first set of latent activations can be considered as interpretations of the patterns/distributions of the first set of data candidates by the machine learning model, and the first set of compressed data points can be considered as dimensionally-reduced versions of the first set of latent activations. Thus, the first set of compressed data points can represent, in reduced and thus computation-amenable format, how the machine learning model interprets the patterns/distributions exhibited by the first set of data candidates. Likewise, in various cases, the second set of latent activations can be considered as interpretations of the patterns/distributions of the second set of data candidates by the machine learning model, and the second set of compressed data points can be considered as dimensionally-reduced versions of the second set of latent activations. So, the second set of compressed data points can represent, in reduced and thus computation-amenable format, how the machine learning model interprets the patterns/distributions exhibited by the second set of data candidates. Therefore, because the first set of compressed data points and the second set of compressed data points can be respectively derived from the first set of data candidates and the second set of data candidates, the diversity score can thus indicate statistical differences between the patterns/distributions exhibited by the first set of data candidates and the patterns/ distributions exhibited by the second set of data candidates, from the perspective of the machine learning model.

In various aspects, the diversity score can indicate whether or not the second set of compressed data points fit into and/or otherwise conform to the clusters of the first set of compressed data points. If the second set of compressed data points fit into and/or conform to the clusters of the first set of compressed data points, the diversity score can be small in magnitude (e.g., can be below any suitable predetermined threshold). This can indicate that the machine learning model does not detect significant differences between the patterns/distributions exhibited by the first set of data candidates and those exhibited by the second set of data candidates (e.g., the machine learning model can be agnostic to the differences between the first set of data candidates and the second set of data candidates). On the other hand, if the second set of compressed data points do not fit into and/or conform to the clusters of the first set of compressed data points, the diversity score can be large in magnitude (e.g., can be above any suitable predetermined threshold). This can indicate that the machine learning model detects significant differences between the patterns/distributions exhibited by the first set of data candidates and those exhibited by the second set of data candidates (e.g., the machine learning model can be not agnostic to the differences between the first set of data candidates and the second set of data candidates).

In various aspects, the diversity component can compute and/or calculate the diversity score in any suitable fashion (e.g., via any suitable mathematical and/or statistical operations and/or functions). For example, the diversity component can, in various cases, compute a center for each cluster of the first set of compressed data points. That is, if each compressed data point is an n-element tuple, the diversity component can compute a central n-element tuple for each cluster of the first set of compressed data points. In various cases, the central n-element tuple of a given cluster can be equal to the average of all the n-element tuples that are in the first set of compressed data points and that belong to that cluster (e.g., it can be known to which cluster each of the first set of compressed data points belongs, since the first set of data candidates can be a training dataset with known ground-truth classifications and since the machine learning model can be trained on the first set of data candidates).

In various instances, for each cluster in the first set of compressed data points, the diversity component can then compute the Euclidean distance between the center of that cluster and every compressed data point that is in the first set of compressed data points and that belongs to that cluster. In various cases, for each cluster in the first set of compressed data points, the diversity component can thus compute the average and/or standard deviation of such computed Euclidean distances. The result can be an average Euclidean distance value, denoted for convenience as $\mu$, and a standard deviation Euclidean distance value, denoted for convenience as $\sigma$, for each cluster in the first set of compressed data points. The $\mu$ and $\sigma$ of a given cluster can be considered as statistically describing the density and/or distribution of that given cluster (e.g., $\mu_1$ and $\sigma_1$ can describe the density and/or distribution of a cluster 1 of the first set of compressed data points; $\mu_2$ and $\sigma_2$ can describe the density and/or distribution of a cluster 2 of the first set of compressed data points).

In various instances, the diversity component can assign each of the second set of compressed data points to a corresponding cluster of the first set of compressed data points. More specifically, the diversity component can, in various cases, assign a given compressed data point in the second set of compressed data points to a given cluster of the first set of compressed data points, if the given compressed data point is closer, in terms of Euclidean distance, to the center of the given cluster than to the center of any other cluster of the first set of compressed data points. In other words, the diversity component can assign each of the second set of compressed data points to the nearest cluster of the first set of compressed data points. Accordingly, for each cluster, the diversity component can compute the Euclidean distance between the center of that cluster and every compressed data point that is in the second set of compressed data points and that has been assigned to that cluster.

In various cases, for each cluster, the diversity component can compute the percentage and/or proportion of the second set of compressed data points that have been assigned to that cluster and that are within and/or outside of any suitable threshold Euclidean distance from the center of that cluster. As a non-limiting example, the threshold Euclidean distance for a given cluster can be equal to $\mu+2\sigma$ (e.g., $\mu_1+2\sigma_1$ can be the threshold Euclidean distance for cluster 1; $\mu_2+2\sigma_2$ can be the threshold Euclidean distance for cluster 2). In various cases, if a compressed data point of the second set of compressed data points is within such threshold Euclidean distance of the center of its assigned cluster, that compressed data point can be considered as a non-outlier. On the other hand, if a compressed data point of the second set of compressed data points is farther than such threshold Euclidean distance from the center of its assigned cluster, that compressed data point can be considered as an outlier.

In various aspects, the diversity component can determine the total percentage and/or proportion of the second set of compressed data points that are considered as outliers. In various instances, the diversity score can be any suitable mathematical function of the such total percentage and/or proportion of the second set of compressed data points that are considered as outliers. In some cases, the diversity score can be equal to such total percentage and/or proportion of the second set of compressed data points that are considered as outliers. In any case, the diversity score can numerically represent how well and/or how poorly the second set of compressed data points fit into the clusters of the first set of compressed data points. Correspondingly, the diversity score can thus represent how differently the machine learning model interprets the patterns/distributions exhibited by the second set of data candidates as compared to how the machine learning model interprets the patterns/distributions exhibited by the first set of data candidates.

So, in various cases, a numerically high diversity score can indicate that a large proportion of the second set of compressed data points are considered as outliers (e.g., that a large proportion of the second set of compressed data points does not fit neatly into the clusters of the first set of compressed data points), which can mean that the machine learning model interprets the patterns/distributions of the second set of data candidates differently from those of the first set of data candidates. On the other hand, in various instances, a numerically low diversity score can indicate that a small proportion of the second set of compressed data points are considered as outliers (e.g., that only a small proportion of the second set of compressed data points does not fit neatly into the clusters of the first set of compressed data points), which can mean that the machine learning model interprets the patterns/distributions of the second set of data candidates similarly to those of the first set of data candidates.

Those having ordinary skill in the art will appreciate that any other suitable mathematical and/or statistical techniques can be implemented by the diversity component to compute the diversity score. Furthermore, although the herein disclosure mainly discusses a diversity score where numerically higher values indicate more diversity and numerically lower values indicate less diversity, those having ordinary skill in the art will appreciate that this is a mere non-limiting example. In various other embodiments, the diversity component can instead compute a similarity score, where higher numerical values indicate more similarity (e.g., less diversity) and where lower numerical values indicate less similarity (e.g., more diversity). In any case, the diversity component can quantify and/or measure how well and/or how poorly the second set of compressed data points fit into and/or conform to the clusters of the first set of compressed data points, which can correspondingly indicate how similar and/or how different the patterns/distributions exhibited by the second set of data candidates are as compared to the patterns/distributions exhibited by the first set of data candidates.

In various embodiments, if the compression component implements a dimensionality reduction technique that yields two-dimensional or three-dimensional compressed data points (e.g., n=2, and/or n=3), the visualization component of the computerized tool can electronically render and/or plot, on any suitable computer screen/monitor, a graph that depicts and/or shows the first set of compressed data points and/or the second set of compressed data points. In various cases, the clusters of the first set of compressed data points can be visually perceived in such graph. Furthermore, how well and/or how poorly the second set of compressed data points fit into and/or conform to the clusters of the first set of compressed data points can likewise be visually perceived in such graph. In some cases, the visualization component can further render, on and/or near the graph, the diversity score.

In various cases, the renditions of the visualization component can be viewed and/or viewable by the developer associated with the machine learning model (e.g., the graph and/or diversity score can be rendered on a computer screen/monitor that is viewable by the developer). Accordingly, the developer can be apprised/notified of the diversity score and/or can visually see the graph, so that the developer can understand how the second set of compressed data points differ from the first set of compressed data points, and thus can understand how the patterns/distributions exhibited by the second set of data candidates differ from those exhibited by the first set of data candidates. In various cases, the developer can reference the diversity score and/or the graph when making design choices/decisions regarding the machine learning model (e.g., when determining whether to further train the machine learning model on the second set of data candidates, when determining whether to automatically annotate the second set of data candidates).

In some cases, the graph can be interactable and/or clickable. That is, the developer can interact with the graph via any suitable human-computer interface device (e.g., a computer mouse, a touchscreen, voice command). In various cases, the developer can click on a compressed data point that is plotted on the graph, and the visualization component can, in response to such click, render a data candidate, from the first set of data candidates and/or the second set of data candidates, which corresponds to the compressed data point that is clicked. Accordingly, the developer can manually inspect any suitable data candidate as desired, by clicking on that data candidate's corresponding compressed data point.

In various embodiments, the execution component of the computerized tool can electronically take any suitable computerized action and/or can electronically make any suitable recommendation based on the diversity score. For example, if the developer desires to determine whether or not to further train the machine learning model on the second set of data candidates, the execution component can compare the diversity score to any suitable predetermined threshold. If the diversity score exceeds the predetermined threshold, the execution component can determine that the patterns/distributions of the second set of data candidates are sufficiently different from those of the first set of data candidates, such that overfitting can be avoided. Accordingly, the execution component can recommend that the machine learning model be further trained on the second set of data candidates. On the other hand, if the diversity score does not exceed the predetermined threshold, the execution component can determine that the patterns/distributions of the second set of data candidates are insufficiently different from those of the first set of data candidates, such that overfitting can occur. Accordingly, the execution component can recommend that the machine learning model not be further trained on the second set of data candidates.

As another example, if the developer desires to determine whether or not to deploy the machine learning model in an environment associated with the second set of data candidates, the execution component can compare the diversity score to any suitable predetermined threshold. If the diversity score exceeds the predetermined threshold, the execution component can determine that the patterns/distributions of the second set of data candidates are insufficiently similar to those of the first set of data candidates, such that inaccurate performance is expected. Accordingly, the execution component can recommend that the machine learning model not be deployed in the environment associated with the second set of data candidates. On the other hand, if the diversity score does not exceed the predetermined threshold, the execution component can determine that the patterns/distributions of the second set of data candidates are sufficiently similar to those of the first set of data candidates, such that accurate performance can be expected. Accordingly, the execution component can recommend that the machine learning model be deployed in the environment associated the second set of data candidates.

As still another example, if the second set of data candidates are created via an augmentation strategy, and if the developer desires to determine whether or not the augmentation strategy is appropriate for the machine learning model, the execution component can compare the diversity score to any suitable predetermined threshold. If the diversity score exceeds the predetermined threshold, the execution component can determine that the machine learning model considers the patterns/distributions of the second set of data candidates to be sufficiently distinct from those of the first set of data candidates, such that the augmentation strategy is efficacious. Accordingly, the execution component can recommend that the augmentation strategy is appropriate for the machine learning model. On the other hand, if the diversity score does not exceed the predetermined threshold, the execution component can determine that the machine learning model considers the patterns/distributions exhibited by the second set of data candidates to be insufficiently distinct from those exhibited by the first set of data candidates, such that the augmentation strategy is not efficacious. Accordingly, the execution component can recommend that the augmentation strategy is inappropriate for the machine learning model.

As yet another example, if the second set of data candidates is unannotated, and if the developer desires to determine whether an automatic annotation technique would be appropriate for the second set of data candidates, the execution component can compare the diversity score to any suitable predetermined threshold. If the diversity score exceeds the predetermined threshold, the execution component can determine that the machine learning model considers the patterns/distributions of the second set of data candidates to be insufficiently similar to those of the first set of data candidates, such that automatic annotation would not yield accurate labels. Accordingly, the execution component can recommend that manual annotation be applied to the second set of data candidates. On the other hand, if the diversity score does not exceed the predetermined threshold, the execution component can determine that the machine learning model considers the patterns/distributions of the second set of data candidates to be sufficiently similar to those of the first set of data candidates, such that automatic annotation would yield accurate labels. Accordingly, the execution component can recommend that automatic annotation be applied to the second set of data candidates. In some embodiments, the execution component can recommend that only the data candidates corresponding to the outliers of the second set of compressed data points be manually annotated, and/or can recommend that only the data candidates corresponding to the non-outliers of the second set of compressed data points be automatically annotated.

Various embodiments of the subject innovation can be employed to use hardware and/or software to solve problems that are highly technical in nature (e.g., to facilitate data diversity visualization and/or quantification for machine learning models), that are not abstract and that cannot be performed as a set of mental acts by a human. Further, some of the processes performed can be performed by a specialized computer (e.g., trained machine learning model) for carrying out defined tasks related to data diversity visualization and/or quantification. For example, such defined tasks can include: accessing, by a device operatively coupled to a processor, a first set of data candidates and a second set of data candidates, wherein a machine learning model is trained on the first set of data candidates; obtaining, by the device, a first set of latent activations generated by the machine learning model based on the first set of data candidates, and obtaining, by the device, a second set of latent activations generated by the machine learning model based on the second set of data candidates; generating, by the device, a first set of compressed data points by applying a dimensionality reduction technique to the first set of latent activations, and generating, by the device, a second set of compressed data points by applying the dimensionality reduction technique to the second set of latent activations; computing, by the device, a diversity score based on the first set of compressed data points and the second set of compressed data points; and/or rendering, by the device, a graph depicting the first set of compressed data points and the second set of compressed data points. Such defined tasks are not conventionally performed manually by humans. Moreover, neither the human mind nor a human with pen and paper can electronically access a machine learning model, a first set of data candidates on which the machine learning model is trained, and a second set of data candidates; can electronically feed the first and second sets of data candidates to the machine learning model to obtain first and second sets of latent activations; can electronically apply dimensionality reduction to the first and second sets of latent activations, thereby yielding first and second sets of compressed data points; can electronically compute a diversity score that quantifies differences between the first and second sets of compressed data points; and/or can electronically render a graph that depicts the first and second sets of compressed data points. Instead, various embodiments of the subject innovation are inherently and inextricably tied to computer technology and cannot be implemented outside of a computing environment (e.g., embodiments of the subject innovation constitute a computerized user interface that can automatically quantify and/or visualize differences between two different machine learning datasets; such a computerized tool cannot be practicably implemented in any sensible way without computers).

Moreover, various embodiments of the subject innovation can integrate into a practical application the disclosed teachings regarding data diversity visualization and/or quantification for machine learning models. As explained above, model developers do not have conventional tools that allow them to quickly and/or objectively make various design decisions when developing a machine learning model. For example, the model developer may want to determine ahead of time whether further training on a particular dataset would improve the generalizability of a particular machine learning model or would instead cause the particular machine learning model to become overfitted. If the model developer does not know such information ahead of time, there is a risk that training is performed and causes overfitting, which constitutes wasted time and/or resources. As another example, the model developer may want to determine ahead of time whether an augmentation strategy is appropriate for a particular machine learning model. If the model developer does not know such information ahead of time, there is a risk that the augmentation strategy is applied despite being inappropriate for the particular machine learning model, which constitutes wasted time and/or resources As yet another example, the model developer may want to determine ahead of time whether a particular unannotated dataset can be accurately labeled via automatic annotation techniques (e.g., transfer learning based on distance to known exemplars) or whether the particular dataset instead should be manually annotated. If the model developer does not know such information ahead of time, there is a risk that either manual annotation is needlessly performed or that automatic annotation is performed despite high levels of inaccuracy, both of which constitute wasted time and/or resources. Conventional tools do not aid the model developer in making these determinations, and so conventional tools cannot help the model developer to avoid such risks of wasting time and/or resources.

In stark contrast, the computerized tool described herein can assist the model developer in making such determinations and can thus help to avoid such risks of wasting time and/or resources. Specifically, the computerized tool described herein can electronically access a first dataset and a second data, where a machine learning model is trained on the first dataset. Moreover, the computerized tool can electronically obtain first and second sets of latent activation values, by respectively feeding the first and second datasets to the machine learning model and by respectively extracting the first and second sets of latent activation values from a hidden layer of the machine learning model. In various cases, the computerized tool can electronically compress, via any suitable dimensionality reduction technique (e.g., t-SNE and/or UMAP), the first and second sets of latent activation values into first and second sets of compressed data points. In various instances, the computerized tool can electronically compute a diversity score that quantifies and/or measures how closely the second set of compressed data points conform to clusters exhibited by the first set of compressed data points. A numerically high diversity score can indicate that the second set of compressed data points do not conform closely to the clusters of the first set of compressed data points, which can mean that the machine learning models is interpreting the second dataset differently from the first dataset. On the other hand, a numerically low diversity score can indicate that the second set of compressed data points conforms closely to the clusters of the first set of compressed data points, which can mean that the machine learning models is interpreting the second dataset similarly to the first dataset. In various cases, the computerized tool can visually render the diversity score and/or can visually render the first and second compressed data points on a graph that is visible to the model developer. Accordingly, the model developer can be notified of the diversity score and/or can manually view the graph. Thus, the model developer can determine whether the first and second datasets are sufficiently similar and/or sufficiently different, and the model developer can make design choices/decisions regarding the machine learning model accordingly (e.g., if the diversity score is sufficiently high, the machine learning model can be further trained on the second dataset without risk of overfitting; if the diversity score is sufficiently low, automatic annotation techniques can be applied to the second dataset). Such a computerized tool clearly constitutes a useful and practical application of computers.

Furthermore, various embodiments of the subject innovation can control real-world tangible devices based on the disclosed teachings. For example, various embodiments of the subject innovation can electronically access a machine learning model, which can be any suitable combination of tangible computing hardware and/or software. In various instances, embodiments of the subject innovation can electronically train and/or recommend training of the machine learning model on a given dataset. Moreover, in various aspects, embodiments of the subject innovation can electronically render, on any suitable computer screen, various visualizations and/or graphs.

It should be appreciated that the herein figures and description provide non-limiting examples of the subject innovation.

FIG. 1 illustrates a block diagram of an example, non-limiting system 100 that can facilitate visualization and/or quantification of data diversity for machine learning models in accordance with one or more embodiments described herein. As shown, a data diversity system 102 can be electronically integrated, via any suitable wired and/or wireless electronic connections, with a machine learning model 104, a set of training data candidates 106, and/or a set of test data candidates 108.

In various cases, the machine learning model 104 can be an artificial neural network, which can exhibit any suitable artificial neural network architecture. For instance, the machine learning model 104 can include any suitable number of layers. In various instances, the machine learning model 104 can include any suitable numbers of neurons in various layers (e.g., different layers can have different numbers of neurons as each other, different layers can have the same number of neurons as each other). In various aspects, various neurons in the machine learning model 104 can implement any suitable activation functions (e.g., sigmoid, softmax, hyperbolic tangent, rectified linear unit). In various cases, the machine learning model 104 can implement any suitable connectivity patterns (e.g., forward connections between neurons, skip connections between neurons, recursive connections between neurons). Although the herein disclosure mainly discusses embodiments in which the machine learning model 104 is an artificial neural network, this is merely a non-limiting example. In various embodiments, the machine learning model 104 can implement any other suitable machine learning architecture.

In various aspects, the machine learning model 104 can be configured in any suitable fashion, so as to be able to receive as input a data candidate and so as to be able to produce some output based on the data candidate. In various cases, the data candidate can have any suitable dimensionality (e.g., can be one or more scalars, one or more vectors, one or more matrices, one or more tensors, and/or one or more strings). In various instances, the output can have any suitable dimensionality (e.g., can be one or more scalars, one or more vectors, one or more matrices, one or more tensors, and/or one or more strings). For example, the machine learning model 104 can be configured to receive as input a medical image (e.g., an X-ray image, an MRI image, a CT image) and to produce as output a label that classifies the medical image into one of two or more different classes (e.g., a label that indicates an anatomical structure that is depicted in the medical image).

In various instances, the set of training data candidates 106 can comprise any suitable number of training data candidates. In various cases, a training data candidate can be a data candidate on which the machine learning model 104 is and/or has been trained. For example, internal parameters (e.g., weight matrices, bias values) of the machine learning model 104 can have been iteratively updated via backpropagation, based on the set of training data candidates 106 and/or based on ground-truth annotations that correspond to the set of training data candidates 106. In some instances, the set of training data candidates 106 can be considered as a sample and/or a subset taken from an even larger collection of data candidates (not shown) on which the machine learning model 104 is and/or has been trained.

In various aspects, the set of test data candidates 108 can comprise any suitable number of test data candidates. In various cases, a test data candidate can be a data candidate on which the machine learning model 104 is not and/or has not yet been trained. In various instances, an operator (not shown) associated with the machine learning model 104 can desire to make a design choice and/or design decision regarding the set of test data candidates 108. For example, in some cases, the set of test data candidates 108 can be sourced and/or sampled from a particular field and/or environment, and the operator can desire to determine whether the machine learning model 104 can be accurately deployed in the particular field and/or environment. As another example, the set of test data candidates 108 can be considered as potential training data; that is, the operator can desire to determine whether the machine learning model 104 can be trained on set of test data candidates 108 without experiencing overfitting. As yet another example, the set of test data candidates 108 can be created by applying a data augmentation strategy to the set of training data candidates 106, and the operator can desire to determine whether the data augmentation strategy helps to generalize the machine learning model 104. As still another example, the set of test data candidates 108 can be unannotated, and the operator can desire to determine whether the set of test data candidates 108 can be accurately automatically annotated. As explained herein, the data diversity system 102 can electronically generate results and/or visualizations based on the set of training data candidates 106 and/or the set of test data candidates 108, and such results and/or visualizations can be leveraged by the operator to quickly and/or objectively make such determinations.

In various embodiments, the data diversity system 102 can comprise a processor 110 (e.g., computer processing unit, microprocessor) and a computer-readable memory 112 that is operably and/or operatively and/or communicatively connected/coupled to the processor 110. The computer-readable memory 112 can store computer-executable instructions which, upon execution by the processor 110, can cause the processor 110 and/or other components of the data diversity system 102 (e.g., receiver component 114, activation component 116, compression component 118, diversity component 120, visualization component 122, and/or execution component 124) to perform one or more acts. In various embodiments, the computer-readable memory 112 can store computer-executable components (e.g., receiver component 114, activation component 116, compression component 118, diversity component 120, visualization component 122, and/or execution component 124), and the processor 110 can execute the computer-executable components.

In various embodiments, the data diversity system 102 can comprise a receiver component 114. In various aspects, the receiver component 114 can electronically retrieve and/or otherwise electronically access the machine learning model 104, the set of training data candidates 106, and/or the set of test data candidates 108, from any suitable centralized and/or decentralized data structure (not shown), whether remote from and/or local to the receiver component 114. Accordingly, in various instances, other components of the data diversity system 102 can manipulate and/or otherwise interact with the machine learning model 104, the set of training data candidates 106, and/or the set of test data candidates 108.

In various embodiments, the data diversity system 102 can comprise an activation component 116. In various aspects, the activation component 116 can electronically obtain a set of training activation maps based on the set of training data candidates 106, and/or can electronically obtain a set of test activation maps based on the set of test data candidates 108. More specifically, in various instances, the activation component 116 can electronically feed a training data candidate (e.g., one of the set of training data candidates 106) to the machine learning model 104, and the activation component 116 can electronically extract from the machine learning model 104 an activation map generated by a hidden layer of the machine learning model 104 based on the training data candidate (e.g., hence the name "training activation map"). The activation component 116 can repeat this for each (and/or fewer than each) training data candidate in the set of training data candidates 106, thereby yielding the set of training activation maps. Likewise, in various instances, the activation component 116 can electronically feed a test data candidate (e.g., one of the set of test data candidates 108) to the machine learning model 104, and the activation component 116 can electronically extract from the machine learning model 104 an activation map generated by a hidden layer of the machine learning model 104 based on the test data candidate (e.g., hence the name "test activation map"). The activation component 116 can repeat this for each (and/or fewer than each) test data candidate in the set of test data candidates 108, thereby yielding the set of test activation maps. In various cases, the set of training activation maps can be considered as illustrating how the machine learning model 104 is internally interpreting the set of training data candidates 106. Similarly, the set of test activation maps can be considered as illustrating how the machine learning model 104 is internally interpreting the set of test data candidates 108.

In various embodiments, the data diversity system 102 can comprise a compression component 118. In various aspects, the compression component 118 can electronically reduce the dimensionalities of the set of training activation maps and/or the set of test activation maps. More specifically, in various cases, the compression component 118 can electronically generate a set of compressed training data points by executing any suitable dimensionality reduction technique on the set of training activation maps. That is, the compression component 118 can convert a training activation map into a compressed training data point, where the compressed training data point can be a vector having a lower dimension (e.g., fewer elements) than the training activation map. The compression component 118 can repeat this for each (and/or fewer than each) training activation map in the set of training activation maps, thereby yielding the set of compressed training data points. Likewise, in various cases, the compression component 118 can electronically generate a set of compressed test data points by executing the dimensionality reduction technique on the set of test activation maps. That is, the compression component 118 can convert a test activation map into a compressed test data point, where the compressed test data point can be a vector having a lower dimension (e.g., fewer elements) than the test activation map. The compression component 118 can repeat this for each (and/or fewer than each) test activation map in the set of test activation maps, thereby yielding the set of compressed test data points.

In various cases, the set of compressed training data points can be considered as exhibiting and/or encapsulating, in a reduced feature space, how the machine learning model 104 interprets the patterns/distributions contained in the set of training data candidates 106. Similarly, in various aspects, the set of compressed test data points can be considered as exhibiting and/or encapsulating, in the reduced feature space, how the machine learning model 104 interprets the patterns/distributions contained in the set of test data candidates 108.

In various embodiments, the data diversity system 102 can comprise a diversity component 120. In various aspects, the diversity component 120 can electronically compute a diversity score based on the set of compressed training data points and/or the set of compressed test data points. More specifically, the diversity component 120 can apply any suitable mathematical and/or statistical calculations so as to statistically compare the set of compressed training data points to the set of compressed test data points.

As mentioned above, because the machine learning model 104 can be trained on the set of training data candidates 106, and because the set of compressed training data points can be derived from the set of training data candidates 106, the set of compressed training data points can exhibit a clustered arrangement, which can correspond to the output that the machine learning model 104 is configured to produce. For example, if the machine learning model 104 is configured to produce a label that classifies an inputted data candidate into one of m different classes, for any suitable positive integer m, the set of compressed training data points can have m different clusters (e.g., m different subsets of similarly-valued compressed training data points).

In various instances, the diversity component 120 can compute statistical metrics (e.g., mean, median, mode, standard deviation) that define the clustered arrangement of the set of compressed training data points. In various aspects, the diversity component 120 can then determine whether the set of compressed test data points conform to the statistical metrics defining the clustered arrangement of the set of compressed training data points. If the set of compressed test data points do conform to such statistical metrics, the diversity component 120 can output a low diversity score, which can indicate a low level of diversity between the set of compressed training data points and the set of compressed test data points. Such low diversity score can correspondingly indicate a low level of difference between how the machine learning model 104 interprets the patterns/distributions exhibited by the set of training data candidates 106 and how the machine learning model 104 interprets the patterns/distributions exhibited by the set of test data candidates 108. In contrast, if the set of compressed test data points do not conform to such statistical metrics, the diversity component 120 can output a high diversity score, which can indicate a high level of diversity between the set of compressed training data points and the set of compressed test data points. Such high diversity score can correspondingly indicate a high level of difference between how the machine learning model 104 interprets the patterns/distributions exhibited by the set of training data candidates 106 and how the machine learning model 104 interprets the patterns/distributions exhibited by the set of test data candidates 108.

In various embodiments, the data diversity system 102 can comprise a visualization component 122. In various aspects, if a compressed data point is a two-element vector and/or a three-element vector, the visualization component 122 can electronically render a graph depicting the set of compressed training data points and/or the set of compressed test data points on any suitable computer monitor/screen (not shown) that is viewable by the operator. In various cases, the visualization component 122 can also electronically render the diversity score on the computer monitor/screen. Accordingly, the operator can be visually notified of the diversity score and/or of the graph. In some cases, the graph can be interactable and/or clickable (e.g., via a computer mouse and/or any other suitable human-computer interface device). In various instances, when the operator clicks on a given compressed data point that is plotted in the graph, the visualization component can electronically render on the computer monitor/screen a data candidate that corresponds to the compressed data point that is clicked, thereby allowing the operator to quickly and manually inspect the data candidate as desired. In any case, the operator can thus leverage the diversity score and/or the graph when making various design decisions regarding the set of test data candidates 108 and/or the machine learning model 104.

In various embodiments, the data diversity system 102 can comprise an execution component 124. In various aspects, the execution component 124 can electronically transmit the diversity score and/or the graph to any other suitable computing device (not shown). In various instances, the execution component 124 can make various electronic recommendations to the operator based on the diversity score. For example, if the operator desires to determine whether the machine learning model 104 can be trained on the set of test data candidates 108 without experiencing overfitting, the execution component 124 can compare the diversity score to any suitable threshold and can make a recommendation accordingly. As another example, if the operator desires to determine whether the machine learning model 104 can be accurately deployed in a field and/or environment associated with the set of test data candidates 108, the execution component 124 can compare the diversity score to any suitable threshold and can make a recommendation accordingly. As yet another example, if the set of test data candidates 108 is created by modifying the set of training data candidates 106 via an augmentation strategy, and if the operator desires to determine whether such augmentation strategy helps to improve the generalizability of the machine learning model 104, the execution component 124 can compare the diversity score to any suitable threshold and can make a recommendation accordingly. As still another example, if the set of test data candidates 108 is unannotated, and if the operator desires to determine whether automatic annotation can be accurately applied to the set of test data candidates 108, the execution component 124 can compare the diversity score to any suitable threshold and can make a recommendation accordingly.

Figure 2:
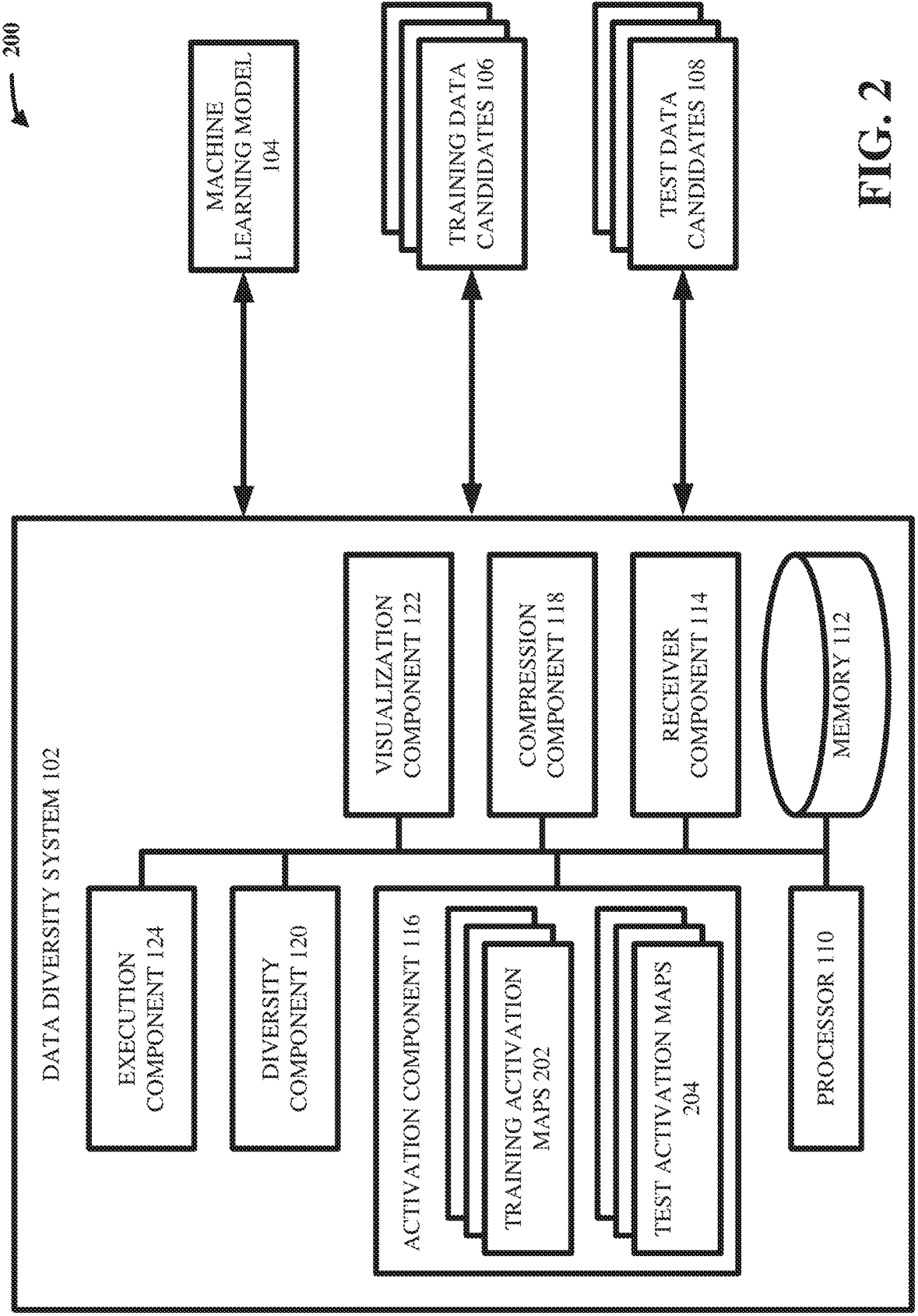
FIG. 2 illustrates a block diagram of an example, non-limiting system including activation maps that facilitates visualization and/or quantification of data diversity for machine learning models in accordance with one or more embodiments described herein.

FIG. 2 illustrates a block diagram of an example, non-limiting system 200 including activation maps that can facilitate visualization and/or quantification of data diversity for machine learning models in accordance with one or more embodiments described herein. As shown, the system 200 can, in some cases, comprise the same components as the system 100, and can further comprise a set of training activation maps 202 and/or a set of test activation maps 204.

In various embodiments, the activation component 116 can electronically obtain the set of training activation maps 202 based on the set of training data candidates 106, and/or can electronically obtain the set of test activation maps 204 based on the set of test data candidates 108. More specifically, in various instances, the activation component 116 can electronically feed each of the set of training data candidates 106 to the machine learning model 104, and can electronically extract activation values generated by a hidden layer of the machine learning model 104, thereby yielding the set of training activation maps 202. In similar fashion, the activation component 116 can, in various aspects, electronically feed each of the set of test data candidates 108 to the machine learning model 104, and can electronically extract activation values generated by a hidden layer of the machine learning model 104, thereby yielding the set of test activation maps 204. This is explained in more detail with respect to FIGS. 3-4.

Figure 3:
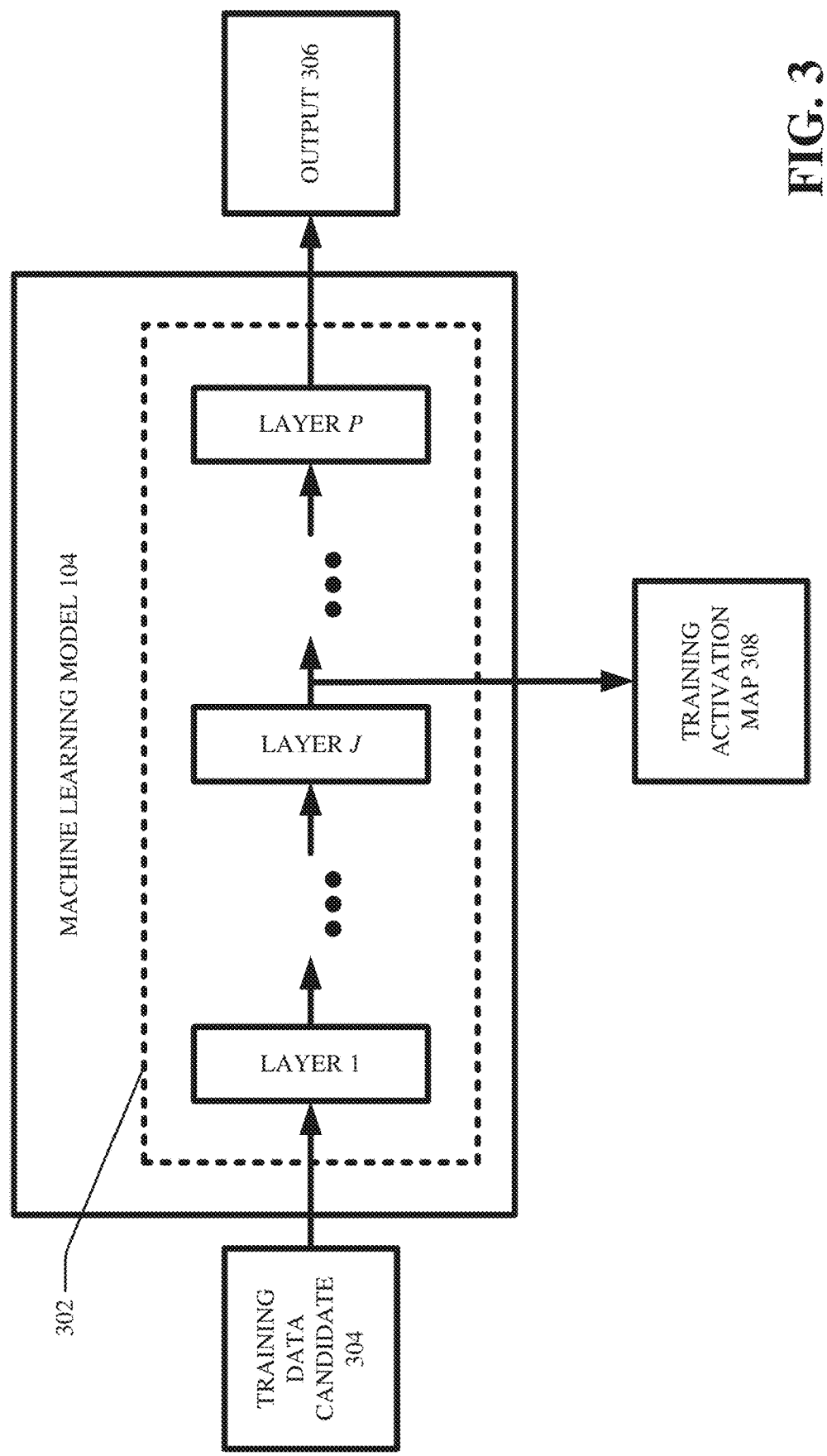
FIGS. 3-4 illustrate example, non-limiting block diagrams showing how various activation maps can be obtained in accordance with one or more embodiments described herein.
Figure 4:
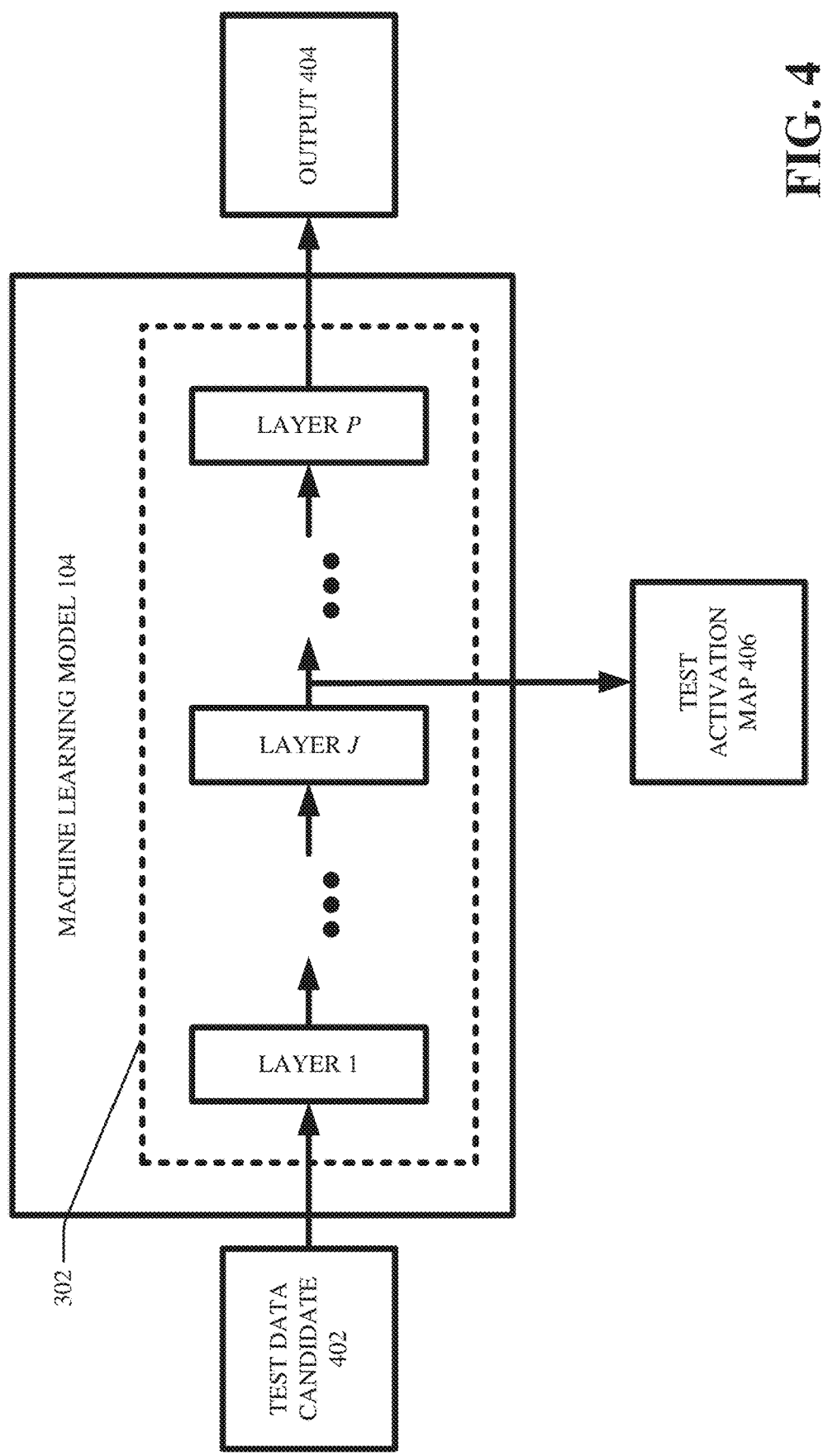

FIGS. 3-4 illustrate example, non-limiting block diagrams showing how various activation maps can be obtained in accordance with one or more embodiments described herein.

As shown in FIG. 3, the machine learning model 104 can, in various embodiments, comprise a set of layers 302. In various instances, the set of layers 302 can include p layers, for any suitable positive integer p: that is, layer 1 to layer p. In various aspects, the layer 1 can be considered as an input layer, and the layer p can be considered as an output layer. In various cases, an intermediate and/or hidden layer in the set of layers 302 can be represented as the intermediate and/or hidden layer j, where j can be any suitable positive integer greater than 1 and less than p. Any layer other than the layer 1 and the layer p can be considered as a hidden layer of the machine learning model 104. As mentioned above, each layer of the set of layers 302 can have any suitable number of neurons, can implement any suitable types of activation functions, and/or can be connected to other layers via any suitable connectivity pattern.

In various embodiments, the activation component 116 can feed a training data candidate 304 as input to the machine learning model 104, where the training data candidate 304 can be one of the data candidates from the set of training data candidates 106. Accordingly, the machine learning model 104 can analyze the training data candidate 304 and can generate an output 306 based on the training data candidate 304. As explained above, the output 306 can be a label that classifies the training data candidate 304.

In further detail, the layer 1 can receive the training data candidate 304 and can generate various latent activations (e.g., can generate one or more latent activation maps) based on the training data candidate 304. In various cases, the latent activations generated by the layer 1 can be received by a next layer 2 (not shown). Based on the latent activations provided by the layer 1, the layer 2 can generate its own latent activations, which can then be received by a next layer 3 (not shown). Similarly, the layer j can receive latent activations generated by a previous layer j−1, and can generate its own latent activations based on the latent activations provided by the previous layer j−1. As shown, the latent activations generated by the layer j can be referred to as the training activation map 308 (e.g., the term "training" can be used since the latent activations are based on the training data candidate 304). Although FIG. 3 depicts the layer j as generating merely one activation map, this is a non-limiting example. In various cases, the layer j can generate any suitable number of activation maps. In various instances, a next layer j+1 (not shown) can then receive the training activation map 308 generated by the layer j, and can generate its own latent activations based on the training activation map 308. Likewise, the layer p can receive latent activations produced by a previous layer p−1 (not shown) and can generate the output 306 based on the latent activations of the previous layer p−1.

In various aspects, after the activation component 116 feeds the training data candidate 304 to the layer 1, the activation component 116 can electronically extract, capture, and/or otherwise record the training activation map 308 that is produced by the layer j. In various cases, the training activation map 308 can be considered as a latent activation map generated by a hidden layer (e.g., layer j) of the machine learning model 104 based on the training data candidate 304. In various instances, the activation component 116 can repeat this procedure for every (and/or for fewer than every) data candidate in the set of training data candidates 106. The ultimate result of such repetition can be the set of training activation maps 202.

FIG. 4 is analogous to FIG. 3. As shown in FIG. 4, the activation component 116 can, in various embodiments, feed a test data candidate 402 as input to the machine learning model 104, where the test data candidate 402 can be one of the data candidates from the set of test data candidates 108. Accordingly, the machine learning model 104 can analyze the test data candidate 402 and can generate an output 404 based on the test data candidate 402. As explained above, the output 404 can be a label that classifies the test data candidate 402.

In further detail, the layer 1 can receive the test data candidate 402 and can generate various latent activations (e.g., can generate one or more latent activation maps) based on the test data candidate 402. In various cases, the latent activations generated by the layer 1 can be received by a next layer 2 (not shown). Based on the latent activations provided by the layer 1, the layer 2 can generate its own latent activations, which can then be received by a next layer 3 (not shown). Similarly, the layer j can receive latent activations generated by a previous layer j−1, and can generate its own latent activations based on the latent activations provided by the previous layer j−1. As shown, the latent activations generated by the layer j can be referred to as the test activation map 406 (e.g., the term "test" can be used since the latent activations are based on the test data candidate 402). Although FIG. 4 depicts the layer j as generating merely one activation map, this is a non-limiting example. In various cases, the layer j can generate any suitable number of activation maps. In various instances, a next layer j+1 (not shown) can then receive the test activation map 406 generated by the layer j, and can generate its own latent activations based on the test activation map 406. Likewise, the layer p can receive latent activations produced by a previous layer p−1 (not shown) and can generate the output 404 based on the latent activations of the previous layer p−1.

In various aspects, after the activation component 116 feeds the test data candidate 402 to the layer 1, the activation component 116 can electronically extract, capture, and/or otherwise record the test activation map 406 that is produced by the layer j. In various cases, the test activation map 406 can be considered as a latent activation map generated by a hidden layer (e.g., layer j) of the machine learning model 104 based on the test data candidate 402. In various instances, the activation component 116 can repeat this procedure for every (and/or for fewer than every) data candidate in the set of test data candidates 108. The ultimate result of such repetition can be the set of test activation maps 204.

As mentioned above, the training data candidate 304 and/or the test data candidate 402 can, in various embodiments, exhibit any suitable dimensionalities (e.g., can each be one or more scalars, one or more vectors, one or more matrices, one or more tensors, and/or any suitable combination thereof). Similarly, the output 306 and/or the output 404 can, in various instances, can exhibit any suitable dimensionalities. Moreover, in various aspects, the latent activations generated by the layers of the set of layers 302 can exhibit any suitable dimensionalities. Indeed, those having ordinary skill in the art will appreciate that the dimensionality of a latent activation map (e.g., 308 and/or 406) can depend upon the number and/or arrangement of neurons in the layer that generates the latent activation map (e.g., different layers can have different numbers of neurons and thus can generate different latent activations having different dimensionalities).

Those having ordinary skill in the art will appreciate that the set of training activation maps 202 can represent and/or otherwise indicate how the machine learning model 104 is internally interpreting the set of training data candidates 106. Likewise, the set of test activation maps 204 can be considered as representing and/or otherwise indicating how the machine learning model 104 is internally interpreting the set of test data candidates 108. Accordingly, it can be desirable to compare the set of training activation maps 202 with the set of test activation maps 204. However, because each activation map in the set of training activation maps 202 and/or in the set of test activation maps 204 can be a high-dimensional matrix and/or tensor (e.g., each activation map can include hundreds and/or thousands of elements), performing computations on the set of training activation maps 202 and/or on the set of test activation maps 204 can be difficult and/or suboptimal.

Figure 5:
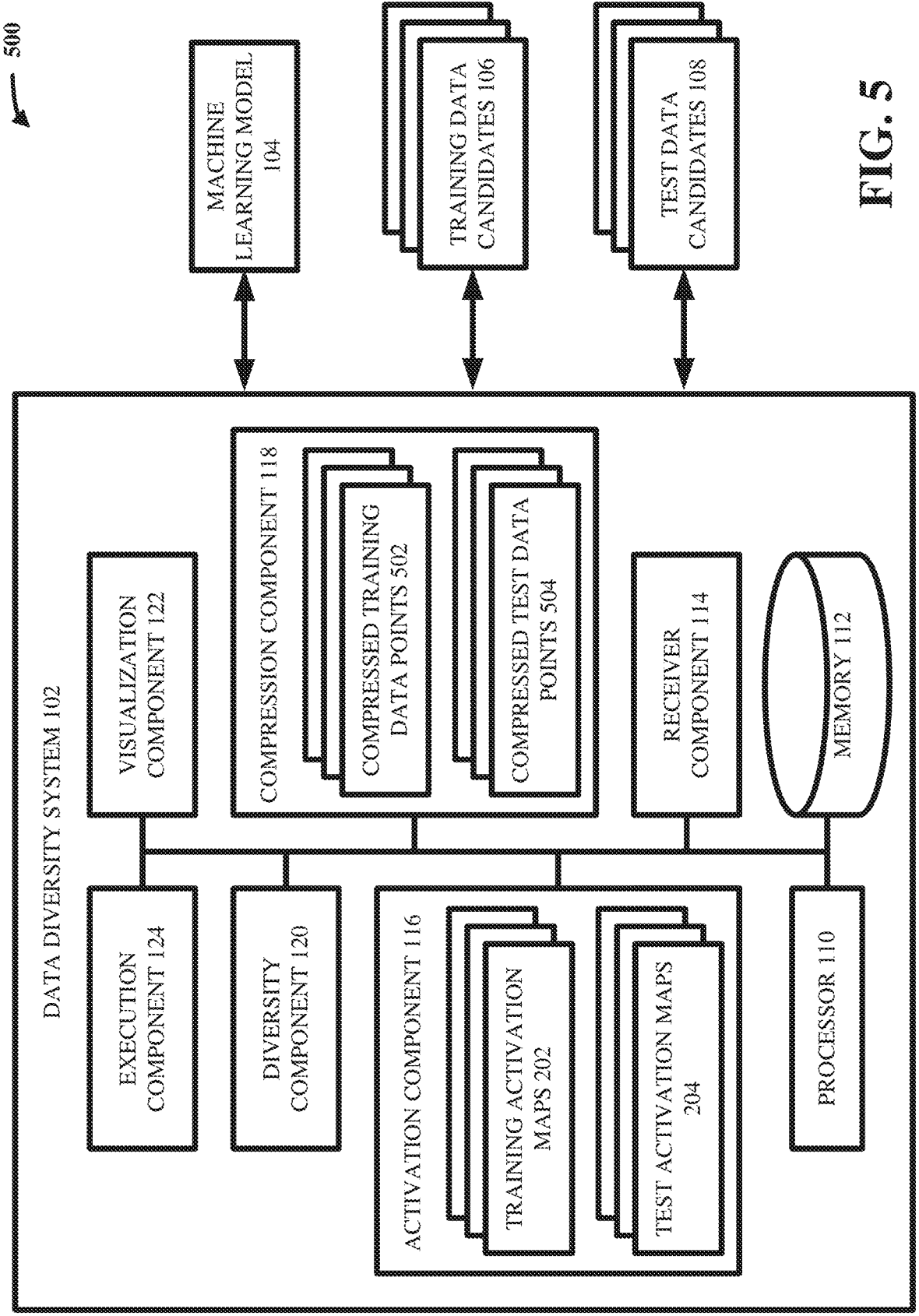
FIG. 5 illustrates a block diagram of an example, non-limiting system including compressed data points that facilitates visualization and/or quantification of data diversity for machine learning models in accordance with one or more embodiments described herein.

FIG. 5 illustrates a block diagram of an example, non-limiting system 500 including compressed data points that can facilitate visualization and/or quantification of data diversity for machine learning models in accordance with one or more embodiments described herein. As shown, the system 500 can, in some cases, comprise the same components as the system 200, and can further comprise a set of compressed training data points 502 and/or a set of compressed test data points 504.

In various embodiments, the compression component 118 can electronically generate the set of compressed training data points 502 based on the set of training activation maps 202, and/or can electronically generate the set of compressed test data points 504 based on the set of test activation maps 204. More specifically, in various instances, the compression component 118 can, via any suitable dimensionality reduction technique (e.g., t-SNE and/or UMAP), electronically reduce the dimensionality of each of the set of training activation maps 202, thereby yielding the set of compressed training data points 502. Similarly, in various cases, the compression component 118 can, via the dimensionality reduction technique, electronically reduce the dimensionality of each of the set of test activation maps 204, thereby yielding the set of compressed test data points 504. This is explained in more detail with respect to FIG. 6.

Figure 6:
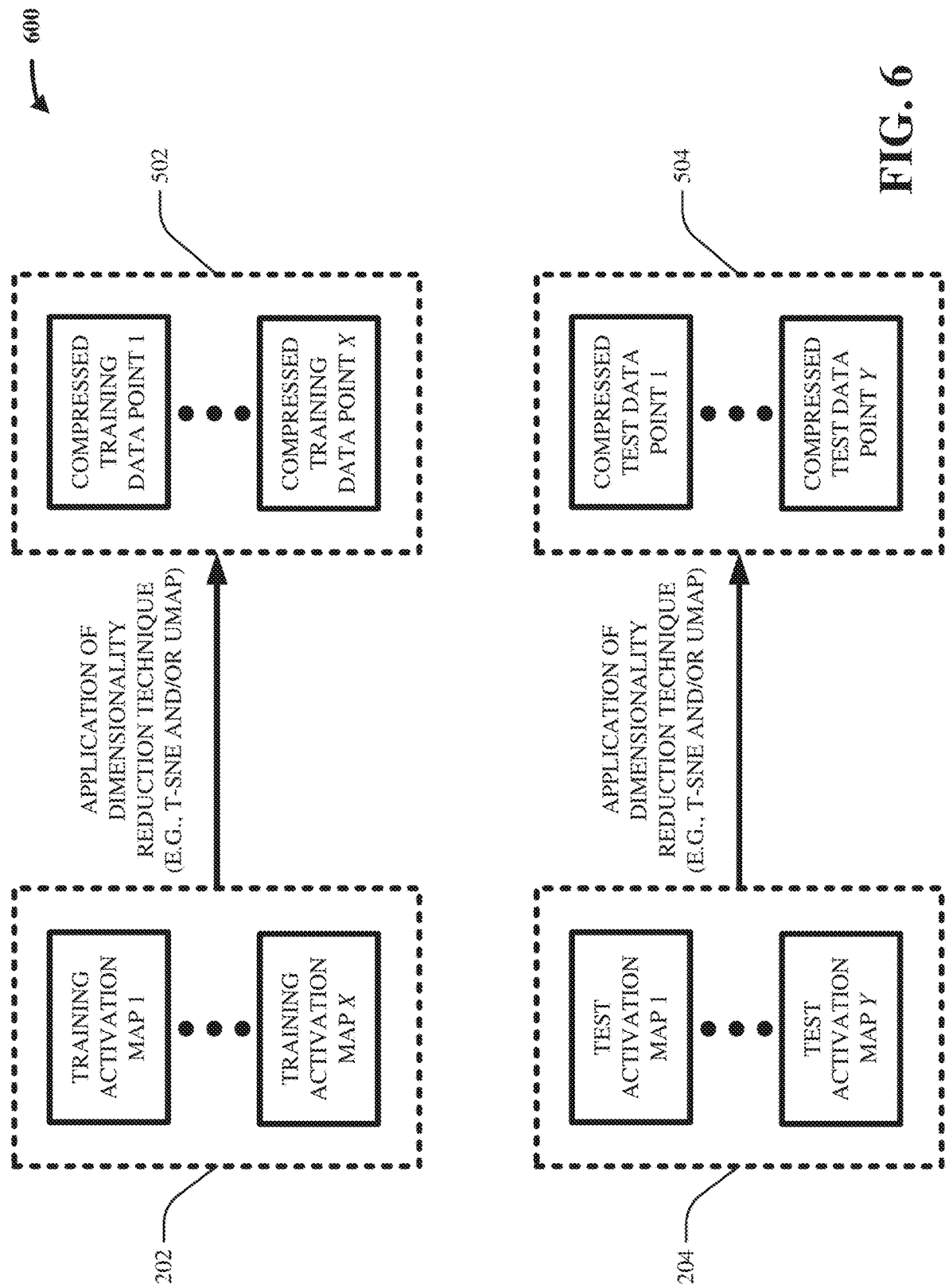
FIG. 6 illustrates an example, non-limiting block diagram showing how various compressed data points can be obtained in accordance with one or more embodiments described herein.

FIG. 6 illustrates an example, non-limiting block diagram showing how various compressed data points can be obtained in accordance with one or more embodiments described herein.

As shown, in various cases, the set of training activation maps 202 can comprise any suitable number of training activation maps. That is, the set of training activation maps 202 can include a training activation map 1 to a training activation map x, for any suitable positive integer x. In various instances, the compression component 118 can electronically apply any suitable dimensionality reduction technique (e.g., t-SNE, UMAP) to the set of training activation maps 202, thereby converting and/or transforming the set of training activation maps 202 into the set of compressed training data points 502. As shown, the set of compressed training data points 502 can respectively correspond to the set of training activation maps 202. In other words, because the set of training activation maps 202 can include x separate training activation maps, the set of compressed training data points 502 can include x separate compressed training data points (e.g., a compressed training data point 1 to a compressed training data point x). More specifically, the compressed training data point 1 can correspond to the training activation map 1, meaning that the compressed training data point 1 can be considered as a compressed and/or dimensionally-reduced version of the training activation map 1. For example, the training activation map 1 can be a matrix that has hundreds and/or thousands of elements, and the compressed training data point 1 can be an n-element vector that represents the training activation map 1, for any suitable positive integer n (e.g., n=2, n=50). Similarly, the compressed training data point x can correspond to the training activation map x, meaning that the compressed training data point x can be considered as a compressed and/or dimensionally-reduced version of the training activation map x. For example, the training activation map x can be a matrix that has hundreds and/or thousands of elements, and the compressed training data point x can be an n-element vector that represents the training activation map x. Because the set of compressed training data points 502 can be derived from the set of training activation maps 202, the set of compressed training data points 502 can exhibit the patterns/distributions of the set of training activation maps 202. However, since the set of compressed training data points 502 can have a lower dimensionality than the set of training activation maps 202, computations can be more easily performed on the set of compressed training data points 502 than on the set of training activation maps 202.

As shown, in various cases, the set of test activation maps 204 can comprise any suitable number of training activation maps. That is, the set of test activation maps 204 can include a training activation map 1 to a training activation map y, for any suitable positive integer y (e.g., y can be equal to or not equal to x). In various instances, the compression component 118 can electronically apply any suitable dimensionality reduction technique (e.g., t-SNE, UMAP) to the set of test activation maps 204, thereby converting and/or transforming the set of test activation maps 204 into the set of compressed test data points 504. As shown, the set of compressed test data points 504 can respectively correspond to the set of test activation maps 204. In other words, because the set of test activation maps 204 can include y separate test activation maps, the set of compressed test data points 504 can include y separate compressed test data points (e.g., a compressed test data point 1 to a compressed test data point y). More specifically, the compressed test data point 1 can correspond to the test activation map 1, meaning that the compressed test data point 1 can be considered as a compressed and/or dimensionally-reduced version of the test activation map 1. For example, the test activation map 1 can be a matrix that has hundreds and/or thousands of elements, and the compressed test data point 1 can be an n-element vector that represents the test activation map 1, for any suitable positive integer n (e.g., n=2, n=50). Similarly, the compressed test data point y can correspond to the test activation map y, meaning that the compressed test data point y can be considered as a compressed and/or dimensionally-reduced version of the test activation map y. For example, the test activation map y can be a matrix that has hundreds and/or thousands of elements, and the compressed test data point y can be an n-element vector that represents the test activation map y. Because the set of compressed test data points 504 can be derived from the set of test activation maps 204, the set of compressed test data points 504 can exhibit the patterns/distributions of the set of test activation maps 204. However, since the set of compressed test data points 504 can have a lower dimensionality than the set of test activation maps 204, computations can be more easily performed on the set of compressed test data points 504 than on the set of test activation maps 204.

Figure 7:
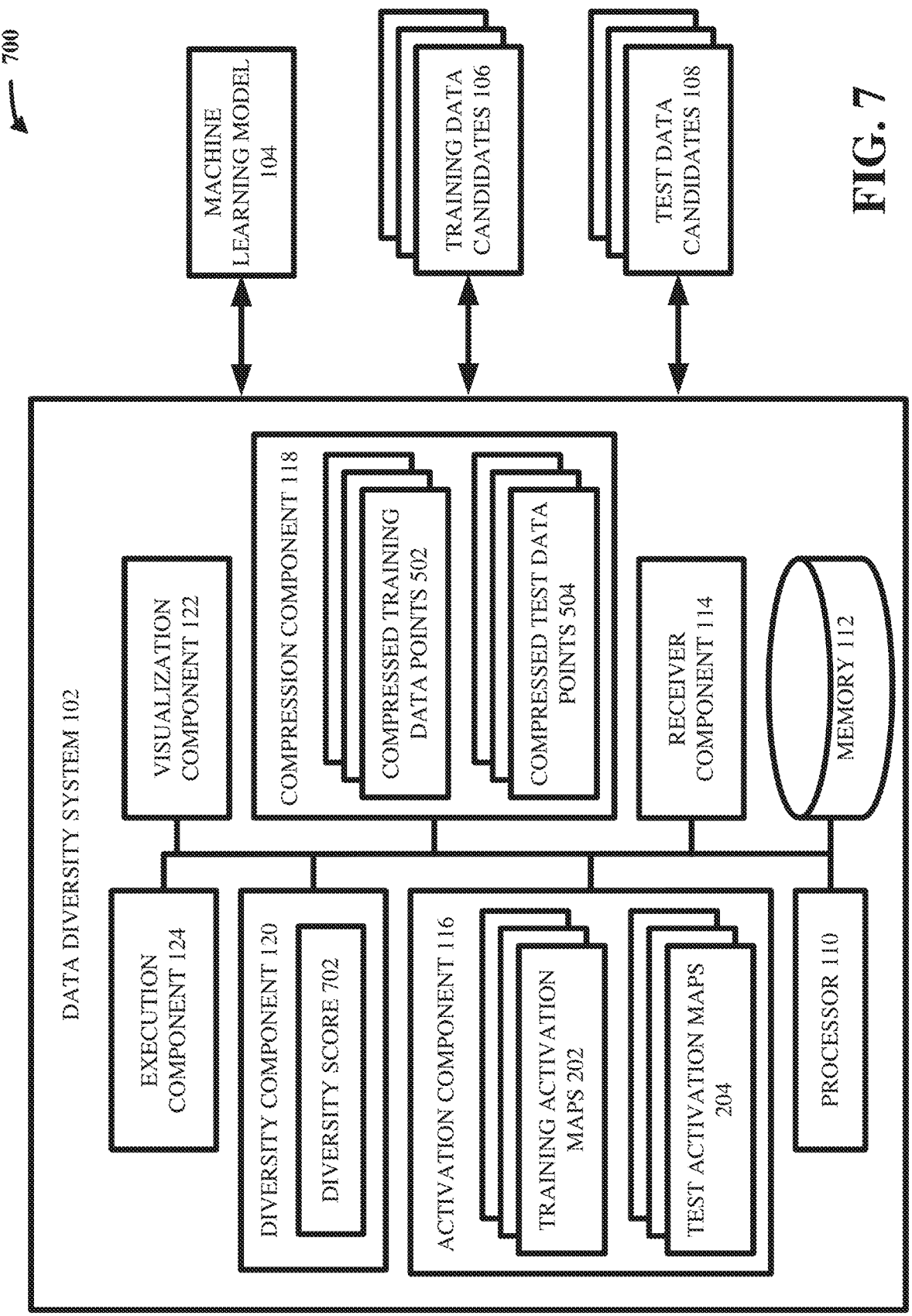
FIG. 7 illustrates a block diagram of an example, non-limiting system including a diversity score that facilitates visualization and/or quantification of data diversity for machine learning models in accordance with one or more embodiments described herein.

FIG. 7 illustrates a block diagram of an example, non-limiting system 700 including a diversity score that can facilitate visualization and/or quantification of data diversity for machine learning models in accordance with one or more embodiments described herein. As shown, the system 700 can, in some cases, comprise the same components as the system 500, and can further comprise a diversity score 702.

In various embodiments, the diversity component 120 can electronically compute the diversity score 702 based on the set of compressed training data points 502 and/or based on the set of compressed test data points 504. More specifically, the diversity component 120 can statistically analyze the patterns/distributions exhibited by the set of compressed training data points 502, and can compute a measure of how well and/or how poorly the set of compressed test data points 504 conform to those patterns/distributions.

In various embodiments, as explained above, because the set of compressed training data points 502 can be derived from the set of training data candidates 106, and because the machine learning model 104 can be trained on the set of training data candidates 106, the set of compressed training data points 502 can exhibit clusters that correspond to the output which the machine learning model 104 is configured to generate. For example, if the machine learning model 104 is configured to classify an inputted data candidate into one of m distinct classes, for any suitable positive integer m, the compressed training data points 502 can be arranged into m clusters. In various aspects, a cluster can be a collection and/or subset of compressed training data points that have similar elements as each other (e.g., if two training data candidates belong to the same class, the two compressed training data points that respectively correspond to those two training data candidates can have numerically similar elements and/or can otherwise be separated from each other by a relatively small Euclidean distance).

In various instances, for each cluster, the diversity component 120 can compute a center of that cluster. In various aspects, the center of a given cluster can be equal to the average of all the compressed training data points that belong to the given cluster. For example, if each compressed training data point is an n-element vector, then the center of a given cluster can be the average of all the n-element vectors that are in the set of compressed training data points 502 and that belong to the given cluster. So, if the set of compressed training data points 502 includes m clusters, the diversity component 120 can compute m centers (e.g., one center per cluster, and/or one average n-element vector per cluster).

In various aspects, for each cluster, the diversity component 120 can compute the Euclidean distance between the center of that cluster and every (and/or fewer than every) compressed training data point that belongs to that cluster. In various cases, the diversity component 120 can then compute the average of such Euclidean distances (denoted for convenience as $\mu$) and/or the standard deviation of such Euclidean distances (denoted for convenience as $\sigma$) for each cluster. Accordingly, if the set of compressed training data points 502 includes m clusters, the diversity component 120 can compute m distinct $\mu$ values and/or m distinct $\sigma$ values (e.g., one ($\mu,\sigma$) pair for each cluster, where the ($\mu,\sigma$) pair for a given cluster describes the density and/or spatial distribution of the compressed training data points in the given cluster).

In various instances, the diversity component 120 can assign each of the set of compressed test data points 504 to a corresponding cluster of the set of compressed training data points 502. More specifically, for each compressed test data point, the diversity component 120 can compute the Euclidean distance between that compressed test data point and the center of each cluster of the set of compressed training data points 502, and the diversity component 120 can assign that compressed test data point to the nearest and/or closest cluster. So, if the set of compressed training data points 502 includes m clusters, the diversity component 120 can determine which of those m clusters has a center that is nearest and/or closest (in terms of Euclidean distance) to a given compressed test data point, and the diversity component 120 can accordingly assign the given compressed test data point to that nearest and/or closest cluster.

In various instances, for each of the set of compressed test data points 504, the diversity component 120 can determine whether that compressed test data point is an outlier or a non-outlier. In various cases, a given compressed test data point can be considered as an outlier if the Euclidean distance between the given compressed test data point and the center of the cluster to which the given compressed test data point is assigned is greater than a threshold Euclidean distance that corresponds to the cluster. Conversely, in various aspects, a given compressed test data point can be considered as a non-outlier if the Euclidean distance between the given compressed test data point and the center of the cluster to which the given compressed test data point is assigned is less than a threshold Euclidean distance that corresponds to the cluster. In various instances, the threshold Euclidean distance can vary by cluster. For example, the threshold Euclidean distance for a given cluster can be equal to $\mu+2\sigma$ (e.g., since $\mu$ and $\sigma$ can vary by cluster, the threshold Euclidean distance can likewise vary by cluster). Thus, the diversity component 120 can label each of the set of compressed test data points 504 as either an outlier or a non-outlier.

In various aspects, the diversity component 120 can then compute the total proportion and/or percentage of the set of compressed test data points 504 that are considered as outliers. In various cases, such total proportion and/or percentage can be considered as equal to the diversity score 702. In various other cases, the diversity score 702 can be any suitable mathematical function of such total proportion and/or percentage. In any case, the diversity score 702 can be configured such that a numerically higher magnitude of the diversity score 702 indicates that more of the set of compressed test data points 504 are outliers, which can indicate that the set of compressed test data points 504 does not conform neatly to the clusters of the set of compressed training data points 502. This can mean that the machine learning model 104 is interpreting the patterns/distributions exhibited by the set of test data candidates 108 differently than how the machine learning model 104 is interpreting the patterns/distributions exhibited by the set of training data candidates 106. Moreover, in any case, the diversity score 702 can be configured such that a numerically lower magnitude of the diversity score 702 indicates that more of the set of compressed test data points 504 are non-outliers, which can indicate that the set of compressed test data points 504 conforms more neatly to the clusters of the set of compressed training data points 502. This can mean that the machine learning model 104 is interpreting the patterns/distributions exhibited by the set of test data candidates 108 similarly to how the machine learning model 104 is interpreting the patterns/distributions exhibited by the set of training data candidates 106.

Figure 8:
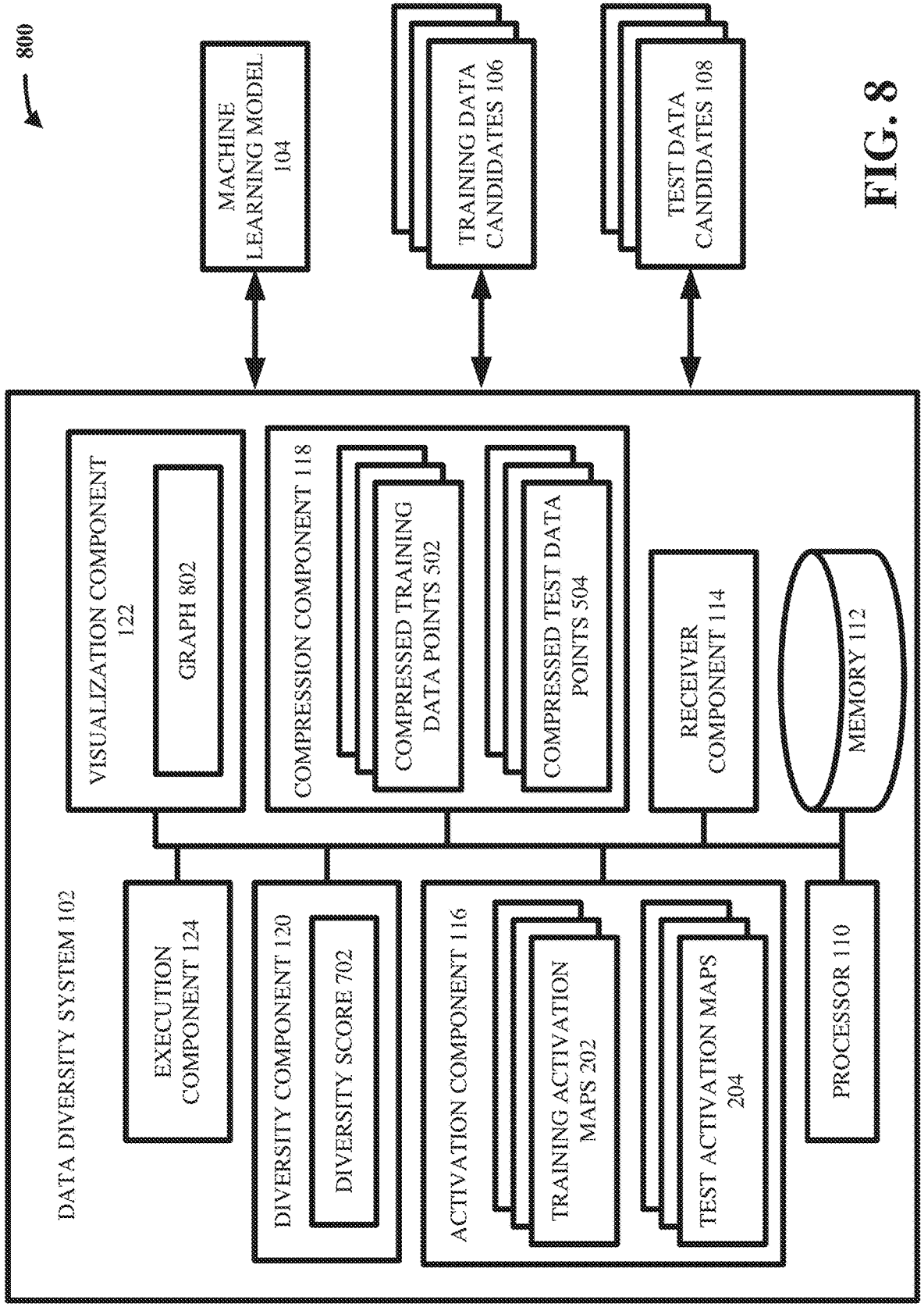
FIG. 8 illustrates a block diagram of an example, non-limiting system including a graph that facilitates visualization and/or quantification of data diversity for machine learning models in accordance with one or more embodiments described herein.

FIG. 8 illustrates a block diagram of an example, non-limiting system 800 including a graph that can facilitate visualization and/or quantification of data diversity for machine learning models in accordance with one or more embodiments described herein. As shown, the system 800 can, in some cases, comprise the same components as the system 700, and can further comprise a graph 802.

In various embodiments, the visualization component 122 can electronically render, on any suitable computer screen and/or monitor (not shown), the graph 802, such that the graph 802 can be viewed by the operator of the machine learning model 104. In various cases, the graph 802 can depict and/or illustrate the set of compressed training data points 502 and/or the set of compressed test data points 504, if each of the set of compressed training data points 502 and/or each of the set of compressed test data points 504 is two-dimensional and/or three-dimensional (e.g., if n=2 and/or if n=3). In various aspects, how well and/or how poorly the set of compressed test data points 504 conforms to the clusters of the set of compressed training data points 502 can be easily visually perceived by viewing the graph 802. In some cases, the graph 802 can further include the diversity score 702. Accordingly, the operator of the machine learning model 104 can be visually apprised of the diversity score 702 and/or can visually see how well and/or how poorly the set of compressed test data points 504 conform to the clusters of the set of compressed training data points 502. Therefore, the operator can leverage and/or rely on the diversity score 702 and/or on the graph 802 when making design decisions regarding the machine learning model 104 and/or the set of test data candidates 108.

In various instances, the graph 802 can be interactable and/or clickable. For example, a compressed data point (e.g., either from 502 and/or 504) that is plotted on the graph can be clickable, and the operator can leverage any suitable human-computer interface device (e.g., computer mouse, touchscreen, voice command) to click on the compressed data point. In various cases, the visualization component 122 can electronically render a data candidate (e.g., from either 106 and/or 108) that corresponds to the compressed data point that is clicked, in response to the compressed data point being clicked. Thus, by selectively clicking different compressed data points that are plotted on the graph 802, the operator of the machine learning model 104 can selectively manually inspect any data candidate as desired. Such functionality can further assist the operator in making design decisions regarding the machine learning model 104 and/or the set of test data candidates 108.

In various embodiments, the execution component 124 can electronically transmit the diversity score 702 and/or the graph 802 to any suitable computing device (not shown). In various other embodiments, the execution component 124 can make recommendations to the operator based on the diversity score 702. For example, if the operator desires to determine whether the machine learning model 104 can be trained on the set of test data candidates 108 without experiencing overfitting, the execution component 124 can compare the diversity score 702 to any suitable threshold and can make a recommendation accordingly. If the diversity score 702 is above the threshold, the execution component 124 can determine that the machine learning model 104 is interpreting the set of test data candidates 108 sufficiently differently from the set of training data candidates 106, such that the machine learning model 104 can be trained on the set of test data candidates 108 without risking overfitting. On the other hand, if the diversity score 702 is below the threshold, the execution component 124 can determine that the machine learning model 104 is interpreting the set of test data candidates 108 insufficiently differently from the set of training data candidates 106, such that the machine learning model 104 cannot be trained on the set of test data candidates 108 without risking overfitting.

As another example, if the operator desires to determine whether the machine learning model 104 can be accurately deployed in a field and/or environment associated with the set of test data candidates 108, the execution component 124 can compare the diversity score to any suitable threshold and can make a recommendation accordingly. If the diversity score 702 is below the threshold, the execution component 124 can determine that the machine learning model 104 is interpreting the set of test data candidates 108 sufficiently similarly to the set of training data candidates 106, such that the machine learning model 104 can be deployed in the field and/or environment without risking frequently inaccurate performance. On the other hand, if the diversity score 702 is above the threshold, the execution component 124 can determine that the machine learning model 104 is interpreting the set of test data candidates 108 insufficiently similarly to the set of training data candidates 106, such that the machine learning model 104 cannot be deployed in the field and/or environment without risking frequently inaccurate performance.

As yet another example, if the set of test data candidates 108 is created by modifying the set of training data candidates 106 via an augmentation strategy, and if the operator desires to determine whether such augmentation strategy helps to improve the generalizability of the machine learning model 104, the execution component 124 can compare the diversity score to any suitable threshold and can make a recommendation accordingly. If the diversity score 702 is above the threshold, the execution component 124 can determine that the machine learning model 104 is interpreting the set of test data candidates 108 sufficiently differently from the set of training data candidates 106, such that the augmentation strategy is filling in the learning gaps of the machine learning model 104. On the other hand, if the diversity score 702 is below the threshold, the execution component 124 can determine that the machine learning model 104 is interpreting the set of test data candidates 108 insufficiently differently from the set of training data candidates 106, such that the augmentation strategy is not filling in the learning gaps of the machine learning model 104.

As still another example, if the set of test data candidates 108 is unannotated, and if the operator desires to determine whether automatic annotation can be accurately applied to the set of test data candidates 108, the execution component 124 can compare the diversity score to any suitable threshold and can make a recommendation accordingly. If the diversity score 702 is below the threshold, the execution component 124 can determine that the machine learning model 104 is interpreting the set of test data candidates 108 sufficiently similarly to the set of training data candidates 106, such that an automatic annotation technique can be accurately applied to the set of test data candidates 108. On the other hand, if the diversity score 702 is above the threshold, the execution component 124 can determine that the machine learning model 104 is interpreting the set of test data candidates 108 insufficiently similarly to the set of training data candidates 106, such that an automatic annotation technique cannot be accurately applied to the set of test data candidates 108. On still another hand, because the diversity component 120 can have labeled each of the set of compressed test data points 504 as either an outlier or a non-outlier, the execution component 124 can recommend that an automatic annotation technique be applied to a compressed test data candidate that corresponds to a non-outlier, and/or can recommend that a manual annotation technique be applied to a compressed test data candidate that corresponds to an outlier.

Figure 9:
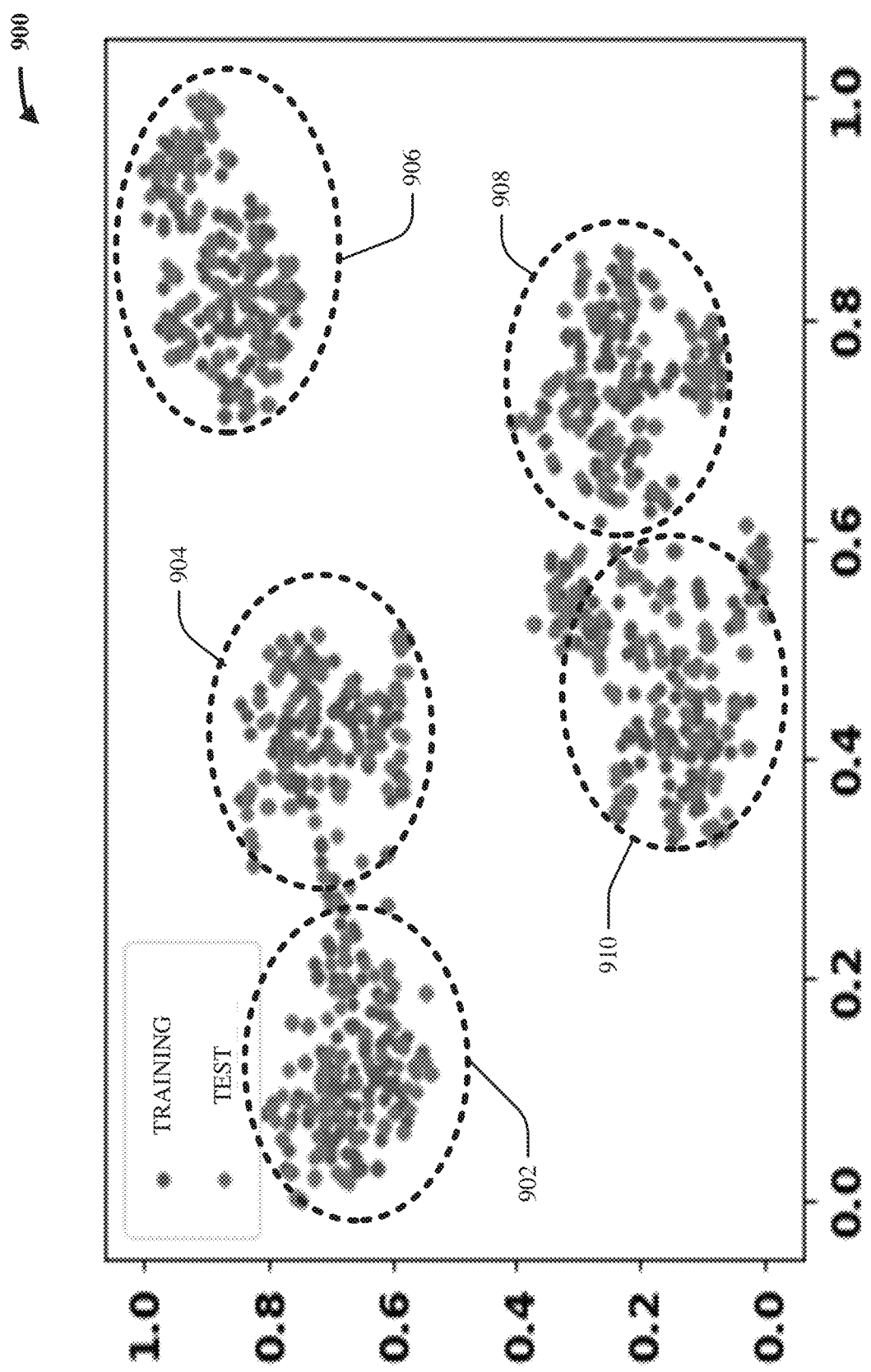
FIGS. 9-11 illustrate example, non-limiting graphs of compressed data points, in accordance with one or more embodiments described herein.
Figure 10:
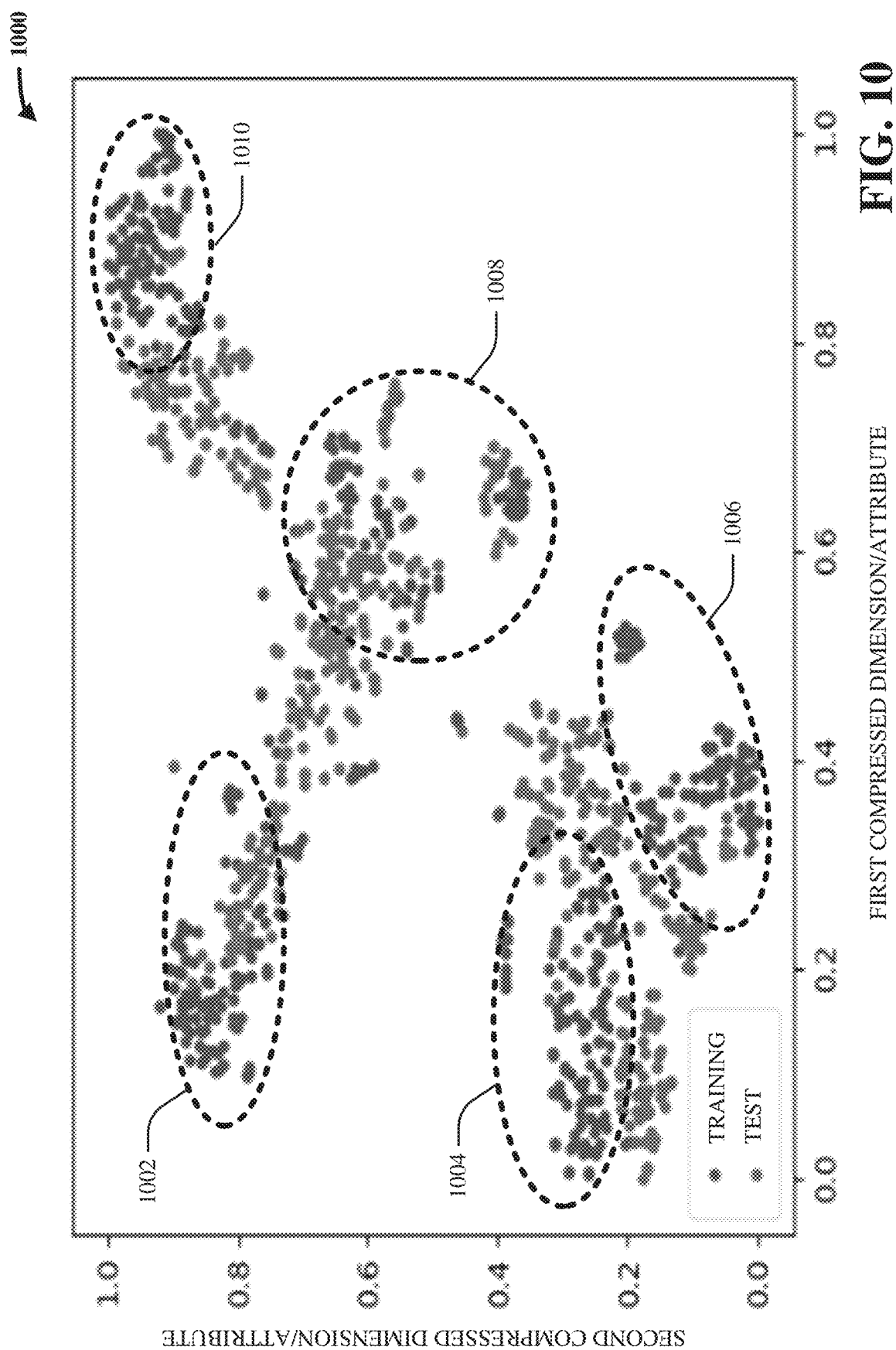
Figure 11:
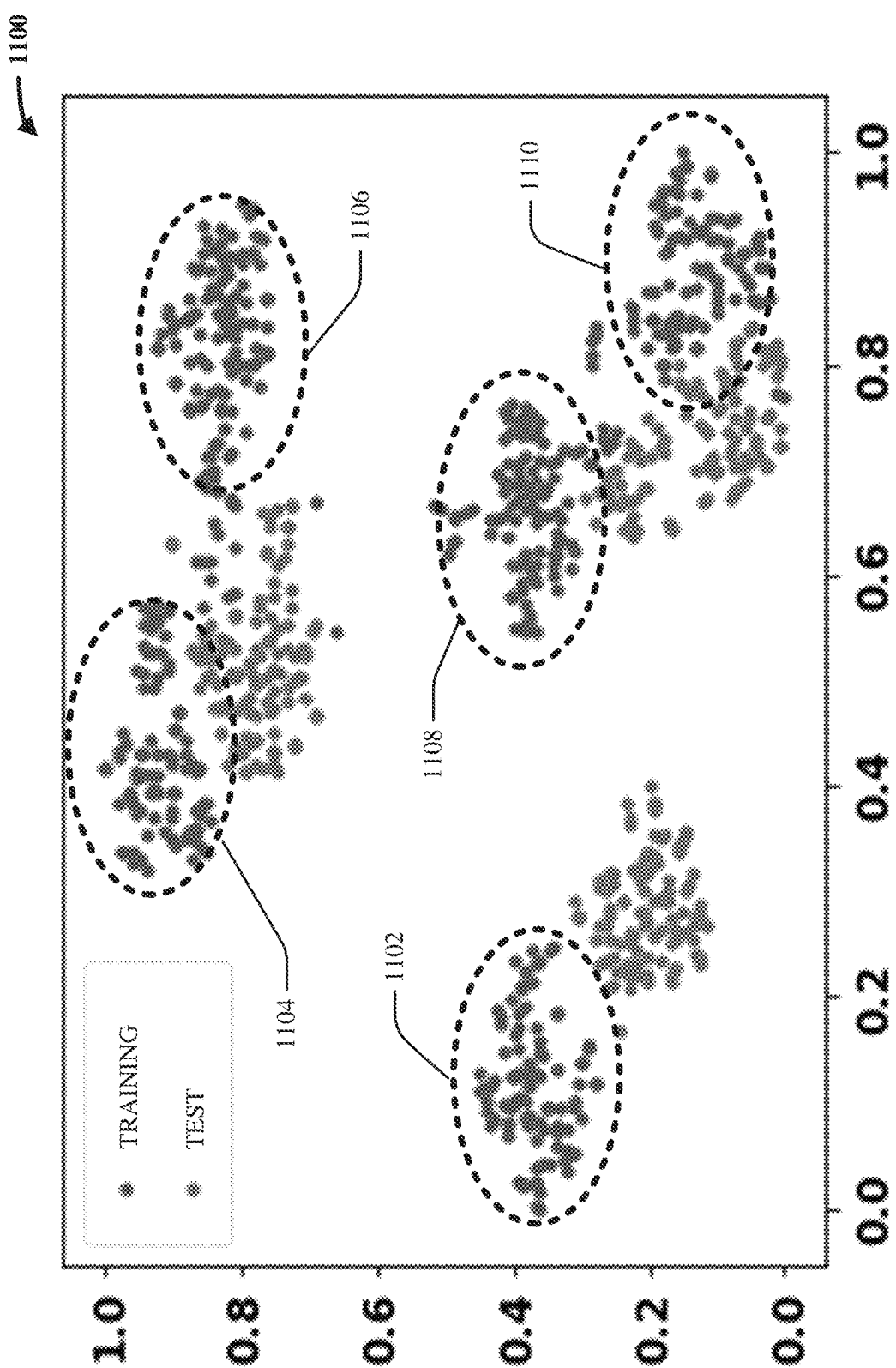
Figure 12:
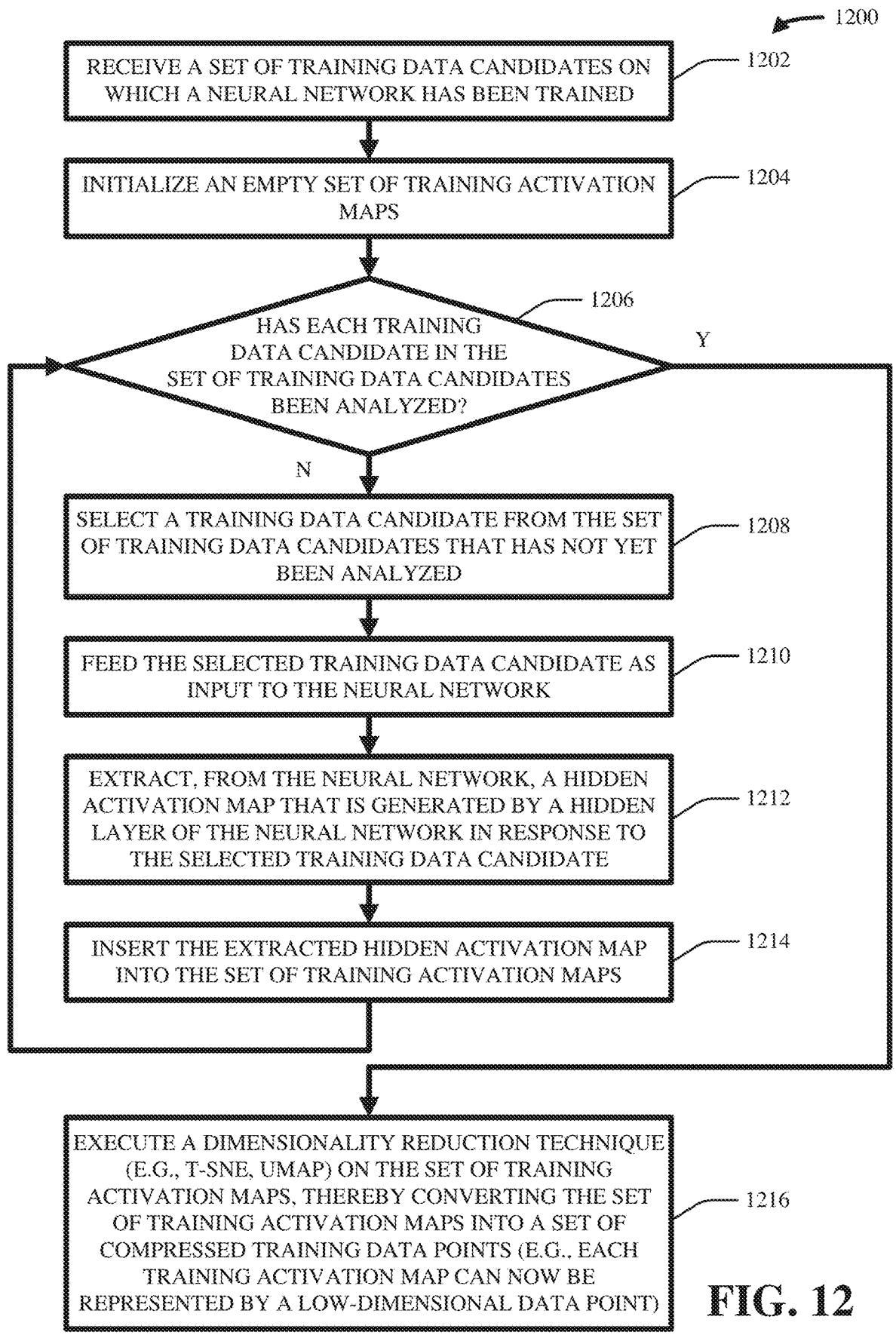
FIGS. 12-15 illustrate flow diagrams of example, non-limiting computer-implemented methods pertaining to quantification of data diversity for machine learning models in accordance with one or more embodiments described herein.
Figure 13:
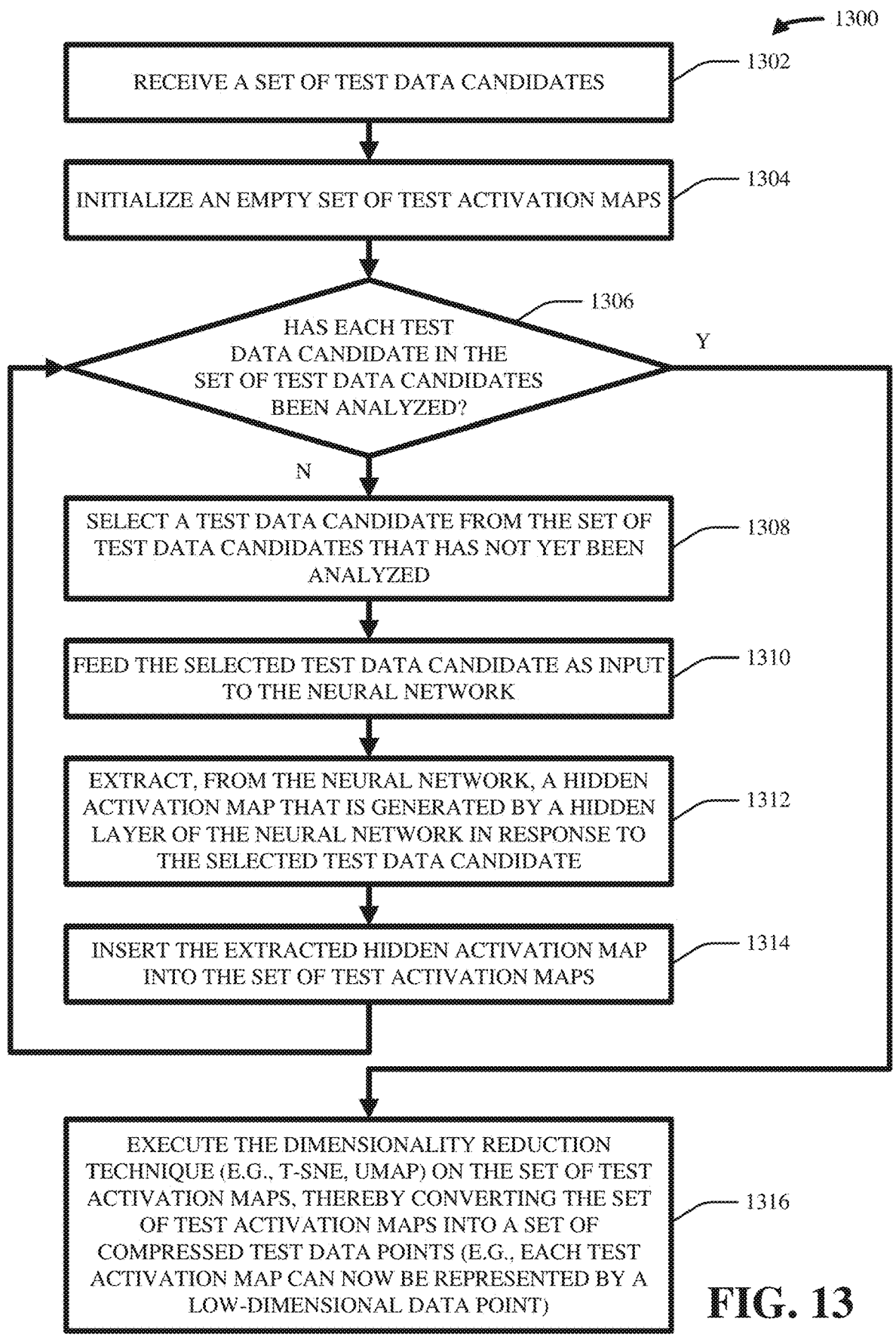
Figure 14:
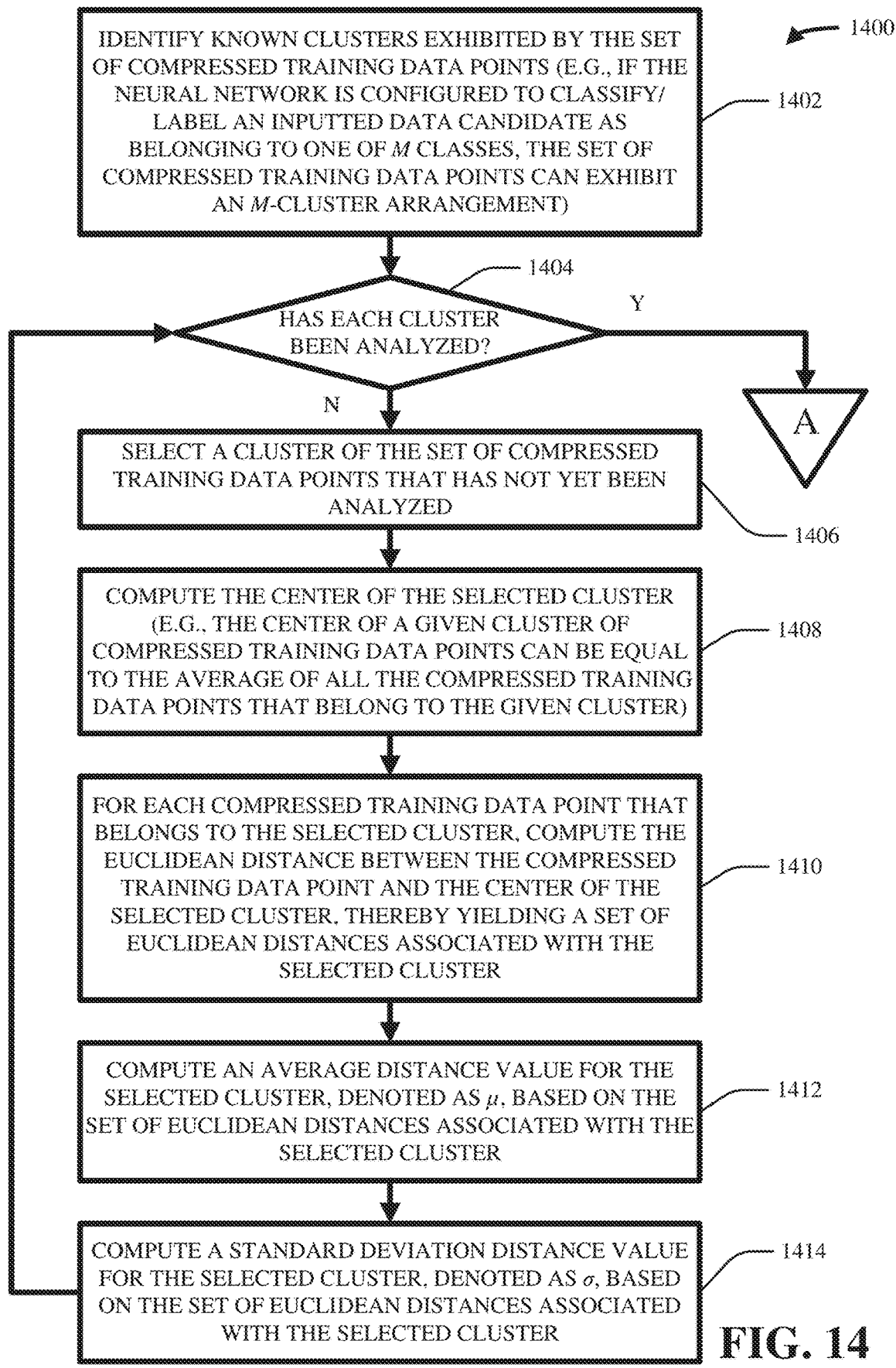
Figure 15:
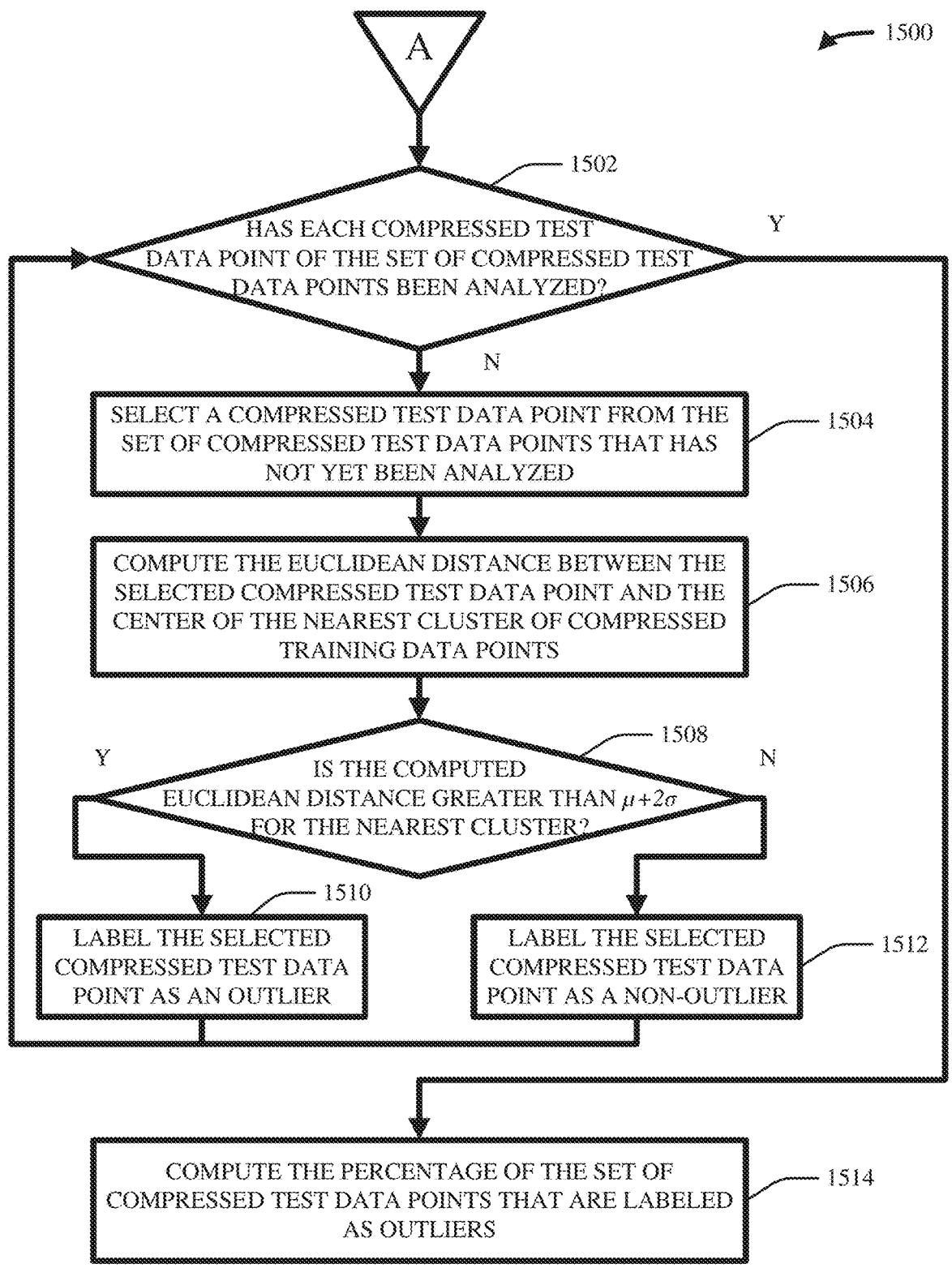

FIGS. 9-11 illustrate example, non-limiting graphs 900-1100 of compressed data points, in accordance with one or more embodiments described herein. In other words, FIGS. 9-11 show example visualizations that can be rendered by the visualization component 122.

In the non-limiting examples of FIGS. 9-11, the machine learning model 104 was configured to classify an X-ray image of a patient's knee into one of five distinct classes: Tibia, Femoral, Sagittal Relevant, Coronal Relevant, or Irrelevant. Moreover, the set of training data candidates comprised 500 X-ray images in total: specifically, 100 X-ray images per class, where the machine learning model 104 had been trained on such images. Furthermore, the set of test data candidates 108 comprised 500 X-ray images that were randomly selected from a new data source (e.g., from a different hospital, from the same hospital but from a different X-ray scanner) as compared to the set of training data candidates 106. The set of compressed training data points 502 and the set of compressed test data points 504 were then generated as described herein, using t-SNE as the dimensionality reduction technique, and where each compressed data point was a two-element vector. The graphs 900-1100 were then plotted.

The set of training data candidates 106 is the same across FIGS. 9-11. However, the set of test data candidates 108 varies across FIGS. 9-11, so that different levels of diversity can be seen. Because t-SNE is non-parametric, the absolute location of each compressed training data point is not fixed across FIGS. 9-11, but the relative distances between the compressed training data points is maintained.

In FIG. 9, the set of compressed training data points 502 is illustrated in red, and the set of compressed test data points 504 is illustrated in green. As shown, the set of compressed training data points 502 are grouped into five distinct clusters 902-910, which correspond to the five distinct classes (e.g., Tibia, Femoral, Sagittal Relevant, Coronal Relevant, Irrelevant). As can be easily seen, the graph 900 shows a non-limiting example where the set of compressed test data points 504 nicely fit into and/or otherwise conform to the clusters of the set of compressed training data points 502. In other words, the green dots in FIG. 9 are all located very close to the red dot clusters. Accordingly, the diversity score 702 that corresponds to the graph 900 can be small in magnitude. Based on the graph 900, the operator can determine that the machine learning model 104 can be accurately deployed on the set of test data candidates 108, that the machine learning model 104 cannot be trained on the set of test data candidates 108 without overfitting, and/or that automatic annotation can be accurately applied to the set of test data candidates 108.

In FIG. 10, the set of compressed training data points 502 is illustrated in red, and the set of compressed test data points 504 is illustrated in green. As shown, the set of compressed training data points 502 are again grouped into five distinct clusters 1002-1010, which correspond to the five distinct classes (e.g., Tibia, Femoral, Sagittal Relevant, Coronal Relevant, Irrelevant). As can be seen, the graph 1000 shows a non-limiting example where the set of compressed test data points 504 fit somewhat into and/or otherwise somewhat conform to the clusters of the set of compressed training data points 502. In other words, some of the green dots in FIG. 10 are located close to the red dot clusters, while other of the green dots are not located close to the red dot clusters. Accordingly, the diversity score 702 that corresponds to the graph 1000 can be intermediate in magnitude.

In FIG. 11, the set of compressed training data points 502 is illustrated in red, and the set of compressed test data points 504 is illustrated in green. As shown, the set of compressed training data points 502 are grouped into five distinct clusters 902-910, which correspond to the five distinct classes (e.g., Tibia, Femoral, Sagittal Relevant, Coronal Relevant, Irrelevant). As can be easily seen, the graph 1100 shows a non-limiting example where the set of compressed test data points 504 do not nicely fit into and/or otherwise conform to the clusters of the set of compressed training data points 502. In other words, the green dots in FIG. 11 are mostly located away from the red dot clusters. Accordingly, the diversity score 702 that corresponds to the graph 1100 can be large in magnitude. Based on the graph 1100, the operator can determine that the machine learning model 104 likely cannot be accurately deployed on the set of test data candidates 108, that the machine learning model 104 can be trained on the set of test data candidates 108 without overfitting, and/or that automatic annotation cannot be accurately applied to the set of test data candidates 108.

FIGS. 12-15 illustrate flow diagrams of example, non-limiting computer-implemented methods 1200-1500 pertaining to quantification of data diversity for machine learning models in accordance with one or more embodiments described herein. In other words, FIGS. 12-15 collectively illustrate example and non-limiting operations/actions which the data diversity system 102 can facilitate in various embodiments.

First, consider the computer-implemented method 1200, which illustrates how the data diversity system 102 can generate the set of compressed training data points 502 based on the set of training data candidates 106.

In various embodiments, act 1202 can include receiving, by a device (e.g., 114) operatively coupled to a processor, a set of training data candidates (e.g., 106) on which a neural network (e.g., 104) has been trained.

In various aspects, act 1204 can include initializing, by the device (e.g., 116) an empty set of training activation maps (e.g., 202).

In various instances, act 1206 can include determining, by the device (e.g., 116), whether each training data candidate in the set of training data candidates has been analyzed by the device. If not, the computer-implemented method 1200 can proceed to act 1208. If so, the computer-implemented method 1200 can proceed to act 1216.

In various cases, act 1208 can include selecting, by the device (e.g., 116), a training data candidate from the set of training data candidates that has not yet been analyzed.

In various aspects, act 1210 can include feeding, by the device (e.g., 116), the selected training data candidate as input to the neural network.

In various instances, act 1212 can include extracting, by the device (e.g., 116) and from the neural network, a hidden activation map that is generated by a hidden layer of the neural network based on and/or in response to the selected training data candidate.

In various cases, act 1214 can include inserting, by the device (e.g., 116), the extracted hidden activation map into the set of training activation maps. In various aspects, the computer-implemented method 1200 can proceed back to act 1206.

As shown, the computer-implemented method 1200 can iterate through acts 1206-1214 until every training data candidate has been analyzed (e.g., until a hidden activation map has been inserted into the set of training activation maps for each training data candidate). At this point, the computer-implemented method 1200 can proceed to act 1216.

In various instances, act 1216 can include executing, by the device (e.g., 118), a dimensionality reduction technique (e.g., t-SNE, UMAP) on the set of training activation maps, thereby converting the set of training activation maps into a set of compressed training data points (e.g., 502). In other words, each training activation map can now be represented by a low-dimensional data point that is easier to visualize and/or mathematically manipulate.

Next, consider the computer-implemented method 1300, which illustrates how the data diversity system 102 can generate the set of compressed test data points 504 based on the set of test data candidates 108.

In various embodiments, act 1302 can include receiving, by the device (e.g., 114), a set of test data candidates (e.g., 108).

In various aspects, act 1304 can include initializing, by the device (e.g., 116) an empty set of test activation maps (e.g., 204).

In various instances, act 1306 can include determining, by the device (e.g., 116), whether each test data candidate in the set of test data candidates has been analyzed by the device. If not, the computer-implemented method 1300 can proceed to act 1308. If so, the computer-implemented method 1300 can proceed to act 1316.

In various cases, act 1308 can include selecting, by the device (e.g., 116), a test data candidate from the set of test data candidates that has not yet been analyzed.

In various aspects, act 1310 can include feeding, by the device (e.g., 116), the selected test data candidate as input to the neural network.

In various instances, act 1312 can include extracting, by the device (e.g., 116) and from the neural network, a hidden activation map that is generated by a hidden layer of the neural network based on and/or in response to the selected test data candidate.

In various cases, act 1314 can include inserting, by the device (e.g., 116), the extracted hidden activation map into the set of test activation maps. In various aspects, the computer-implemented method 1300 can proceed back to act 1306.

As shown, the computer-implemented method 1300 can iterate through acts 1306-1314 until every test data candidate has been analyzed (e.g., until a hidden activation map has been inserted into the set of test activation maps for each test data candidate). At this point, the computer-implemented method 1300 can proceed to act 1316.

In various instances, act 1316 can include executing, by the device (e.g., 118), the dimensionality reduction technique (e.g., t-SNE, UMAP) on the set of test activation maps, thereby converting the set of test activation maps into a set of compressed test data points (e.g., 504). In other words, each test activation map can now be represented by a low-dimensional data point that is easier to visualize and/or mathematically manipulate.

Now, consider the computer-implemented method 1400, which illustrates how the data diversity system 102 can analyze the set of compressed training data points 502.

In various embodiments, act 1402 can include identifying, by the device (e.g., 120), known clusters exhibited by the set of compressed training data points (e.g., 502). In some cases, because the set of compressed training data points can be derived from the set of training data candidates, and because the neural network can be trained on the set of training data candidates, the set of compressed training data points can exhibit clusters that correspond to the output which the neural network is configured to generate. For example, if the neural network is configured to classify and/or label an inputted data candidate as belonging to one of m classes, for any suitable positive integer m, then the set of compressed training data points can exhibit an m-cluster arrangement (e.g., can have in clusters).

In various aspects, act 1404 can include determining, by the device (e.g., 120), whether each cluster of the set of compressed training data points has been analyzed yet. If not, the computer-implemented method 1400 can proceed to act 1406. If so, the computer-implemented method 1400 can proceed to act 1502 of the computer-implemented method 1500.

In various instances, act 1406 can include selecting, by the device (e.g., 120), a cluster of the set of compressed training data points that has not yet been analyzed.

In various cases, act 1408 can include computing, by the device (e.g., 120), the center of the selected cluster. For example, the center of a given cluster of compressed training data points can be equal to the average of all the compressed training data points that belong to that given cluster.

In various aspects, act 1410 can include, for each compressed training data point that belongs to the selected cluster, computing, by the device (e.g., 120), the Euclidean distance between the compressed training data point and the center of the selected cluster. When this is performed for each compressed training data point that belongs to the selected cluster, this is can result in a set of Euclidean distances that are associated with the selected cluster.

In various instances, act 1412 can include computing, by the device (e.g., 120), an average distance value for the selected cluster, which average distance value can be denoted as μ, based on the set of Euclidean distances associated with the selected cluster.

In various cases, act 1414 can include computing, by the device (e.g., 120), a standard deviation distance value for the selected cluster, which standard deviation distance value can be denoted as σ, based on the set of Euclidean distances associated with the selected cluster. In various aspects, the computer-implemented method 1400 can proceed back to act 1404.

As shown, the computer-implemented method 1400 can iterate through acts 1404-1414, until a μ and a σ are computed for each cluster of compressed training data points.

Finally, consider the computer-implemented method 1500, which illustrates how the data diversity system 102 can analyze the set of compressed test data points 504.

In various embodiments, act 1502 can include determining, by the device (e.g., 120), whether each compress test data point in the set of compressed test data points (e.g., 504) has been analyzed. If not, the computer-implemented method 1500 can proceed to act 1504. If so, the computer-implemented method 1500 can proceed to act 1514.

In various aspects, act 1504 can include selecting, by the device (e.g., 120), a compressed test data point from the set of compressed test data points that has not yet been analyzed.

In various instances, act 1506 can include computing, by the device (e.g., 120), the Euclidean distance between the selected compressed test data point and the nearest cluster of compressed training data points (e.g., the cluster whose center is closest and/or nearest in terms of Euclidean distance to the selected compressed test data point).

In various cases, act 1508 can include determining, by the device (e.g., 120), whether the computed Euclidean distance is greater than a threshold of μ+2σ for the nearest cluster (e.g., where μ and σ correspond to the nearest cluster). In other words, the device can determine whether the selected compressed test data point is more than two standard deviations away from the center of the nearest cluster. If so, the computer-implemented method 1500 can proceed to act 1510. If not, the computer-implemented method 1500 can proceed to act 1512.

In various aspects, act 1510 can include labeling, by the device (e.g., 120), the selected compressed test data point as an outlier. In various cases, the computer-implemented method 1500 can proceed back to act 1502.

In various aspects, act 1512 can include labeling, by the device (e.g., 120), the selected compressed test data point as a non-outlier. In various cases, the computer-implemented method 1500 can proceed back to act 1502.

As shown, the computer-implemented method 1500 can iterate through acts 1502-1512 until each compressed test data point has been labeled as either an outlier or a non-outlier. At such time, the computer-implemented method 1500 can proceed to act 1514.

In various instances, act 1514 can include computing, by the device (e.g., 120), the percentage of the set of compressed test data points that are labeled as outliers. In various cases, this percentage can be considered as the diversity score 702. In other cases, the diversity score 702 can be equal to any suitable mathematical function of this percentage. Although not explicitly shown in FIG. 15, the percentage of the set of compressed test data points that are considered as outliers can indicate how similar and/or how dissimilar the set of test data candidates are from the set of training data candidates. Accordingly, as mentioned above, the execution component 124 can take any suitable computing action based on the value of this percentage.

Figure 16:
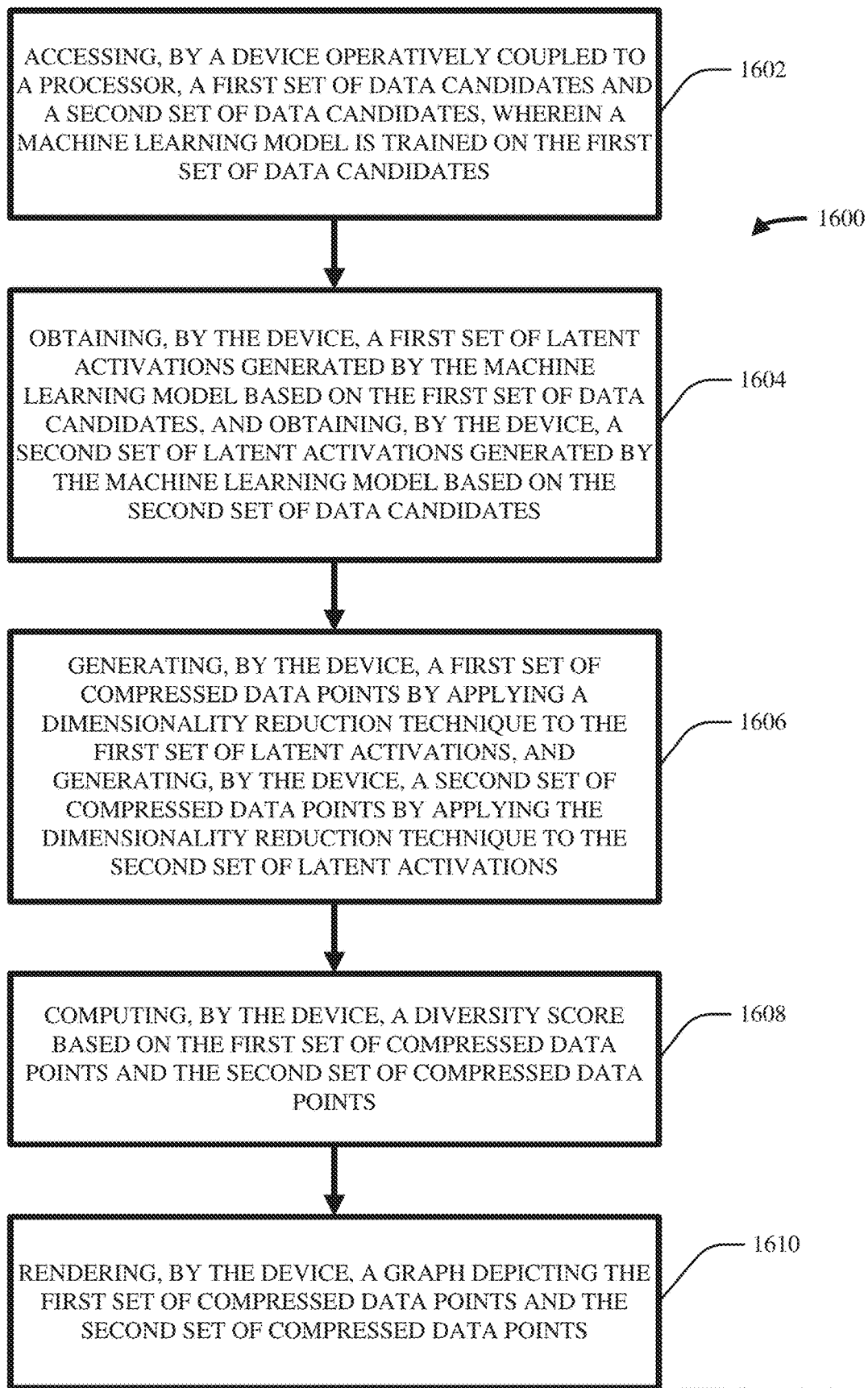
FIG. 16 illustrates a flow diagram of an example, non-limiting computer-implemented method that facilitates visualization and/or quantification of data diversity for machine learning models in accordance with one or more embodiments described herein.

FIG. 16 illustrates a flow diagram of an example, non-limiting computer-implemented method 1600 that can facilitate visualization and/or quantification of data diversity for machine learning models in accordance with one or more embodiments described herein. In various cases, the computer-implemented method 1600 can be implemented by the data diversity system 102.

In various embodiments, act 1602 can include accessing, by a device (e.g., 114) operatively coupled to a processor, a first set of data candidates (e.g., 106) and a second set of data candidates (e.g., 108), wherein a machine learning model (e.g., 104) is trained on the first set of data candidates.

In various instances, act 1604 can include obtaining, by the device (e.g., 116), a first set of latent activations (e.g., 202) generated by the machine learning model based on the first set of data candidates, and obtaining, by the device (e.g., 116), a second set of latent activations (e.g., 204) generated by the machine learning model based on the second set of data candidates.

In various aspects, act 1606 can include generating, by the device (e.g., 118), a first set of compressed data points (e.g., 502) by applying a dimensionality reduction technique to the first set of latent activations, and generating, by the device (e.g., 118), a second set of compressed data points (e.g., 504) by applying the dimensionality reduction technique to the second set of latent activations.

In various instances, act 1608 can include computing, by the device (e.g., 120), a diversity score (e.g., 702) based on the first set of compressed data points and the second set of compressed data points.

In various aspects, act 1610 can include rendering, by the device (e.g., 122), a graph (e.g., 802) depicting the first set of compressed data points and the second set of compressed data points.

Although not explicitly shown in FIG. 16, a given compressed data point that is plotted in the graph can correspond to a given data candidate from the first set of data candidates or the second set of data candidates, the given compressed data point can be clickable as plotted on the graph, and/or the computer-implemented method 1600 can further comprise: rendering, by the device (e.g., 122), the given data candidate in response to the given compressed data point being clicked.

Although not explicitly shown in FIG. 16, the second set of data candidates can represent augmented versions of the first set of data candidates and/or can otherwise represent potential training data for the machine learning model, and the computer-implemented method 1600 can further comprise: recommending, by the device (e.g., 124), that the machine learning model be trained on the second set of data candidates in response to a determination that the diversity score satisfies a predetermined threshold; and recommending, by the device (e.g., 124), that the machine learning model not be trained on the second set of data candidates in response to a determination that the diversity score fails to satisfy the predetermined threshold.

Although not explicitly shown in FIG. 16, the second set of data candidates can be unannotated, and the computer-implemented method 1600 can further comprise: identifying, by the device (e.g., 120), one or more outlying compressed data points in the second set of compressed data points, by comparing the second set of compressed data points to the first set of compressed data points; and recommending, by the device (e.g., 124), that one or more data candidates from the second set of data candidates which correspond to the one or more outlying compressed data points be manually annotated.

Although not explicitly shown in FIG. 16, the second set of data candidates can be unannotated, and the computer-implemented method 1600 can further comprise: identifying, by the device (e.g., 120), one or more non-outlying compressed data points in the second set of compressed data points, by comparing the second set of compressed data points to the first set of compressed data points; and recommending, by the device (e.g., 124), that one or more data candidates from the second set of data candidates which correspond to the one or more non-outlying compressed data points be automatically annotated.

Various embodiments of the subject innovation pertain to a computerized tool that can automatically visualize and/or quantify diversity in input data for artificial intelligence applications. Such a computerized tool can be used for selecting new data candidates from a data lake, deciding on an augmentation strategy to implement, and/or determining which unannotated data candidates can be annotated/curated automatically. Indeed, choosing appropriate data candidates on which to train a machine learning model is important to help avoid overfitting and/or to help improve model generalizability. Moreover, choosing an appropriate data augmentation strategy can likewise be important to help avoid overfitting and/or to help improve model generalizability. Furthermore, because manual annotation is very cumbersome and time consuming, choosing appropriate data candidates for automatic annotation (e.g., semi-supervised annotation via an existing model, transfer learning) can be important to help save time and/or resources. Because the computerized tool described herein can assist a model developer in making these and/or other decisions regarding model design, the computerized tool described herein certainly constitutes a useful and practical application of computers.

Figure 17:
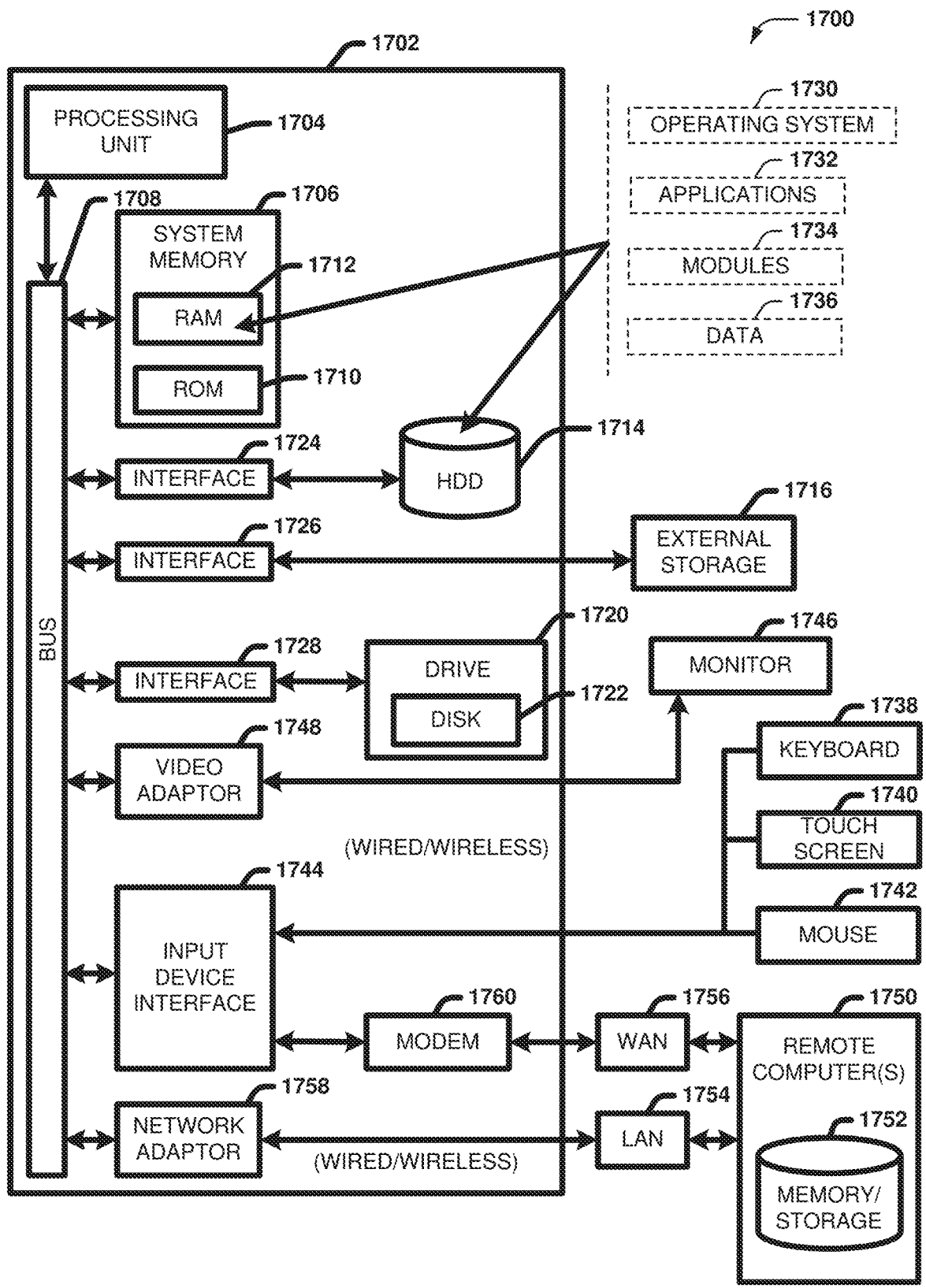
FIG. 17 illustrates a block diagram of an example, non-limiting operating environment in which one or more embodiments described herein can be facilitated.

In order to provide additional context for various embodiments described herein, FIG. 17 and the following discussion are intended to provide a brief, general description of a suitable computing environment 1700 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 17, the example environment 1700 for implementing various embodiments of the aspects described herein includes a computer 1702, the computer 1702 including a processing unit 1704, a system memory 1706 and a system bus 1708. The system bus 1708 couples system components including, but not limited to, the system memory 1706 to the processing unit 1704. The processing unit 1704 can be any of various commercially available processors. Dual microprocessors and other multi processor architectures can also be employed as the processing unit 1704.

The system bus 1708 can be any of several types of bus structure that can further interconnect to a memory bus (with or without a memory controller), a peripheral bus, and a local bus using any of a variety of commercially available bus architectures. The system memory 1706 includes ROM 1710 and RAM 1712. A basic input/output system (BIOS) can be stored in a non-volatile memory such as ROM, erasable programmable read only memory (EPROM), EEPROM, which BIOS contains the basic routines that help to transfer information between elements within the computer 1702, such as during startup. The RAM 1712 can also include a high-speed RAM such as static RAM for caching data.

The computer 1702 further includes an internal hard disk drive (HDD) 1714 (e.g., EIDE, SATA), one or more external storage devices 1716 (e.g., a magnetic floppy disk drive (FDD) 1716, a memory stick or flash drive reader, a memory card reader, etc.) and a drive 1720, e.g., such as a solid state drive, an optical disk drive, which can read or write from a disk 1722, such as a CD-ROM disc, a DVD, a BD, etc. Alternatively, where a solid state drive is involved, disk 1722 would not be included, unless separate. While the internal HDD 1714 is illustrated as located within the computer 1702, the internal HDD 1714 can also be configured for external use in a suitable chassis (not shown). Additionally, while not shown in environment 1700, a solid state drive (SSD) could be used in addition to, or in place of, an HDD 1714. The HDD 1714, external storage device(s) 1716 and drive 1720 can be connected to the system bus 1708 by an HDD interface 1724, an external storage interface 1726 and a drive interface 1728, respectively. The interface 1724 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1702, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1712, including an operating system 1730, one or more application programs 1732, other program modules 1734 and program data 1736. All or portions of the operating system, applications, modules, and/or data can also be cached in the RAM 1712. The systems and methods described herein can be implemented utilizing various commercially available operating systems or combinations of operating systems.

Computer 1702 can optionally comprise emulation technologies. For example, a hypervisor (not shown) or other intermediary can emulate a hardware environment for operating system 1730, and the emulated hardware can optionally be different from the hardware illustrated in FIG. 17. In such an embodiment, operating system 1730 can comprise one virtual machine (VM) of multiple VMs hosted at computer 1702. Furthermore, operating system 1730 can provide runtime environments, such as the Java runtime environment or the .NET framework, for applications 1732. Runtime environments are consistent execution environments that allow applications 1732 to run on any operating system that includes the runtime environment. Similarly, operating system 1730 can support containers, and applications 1732 can be in the form of containers, which are lightweight, standalone, executable packages of software that include, e.g., code, runtime, system tools, system libraries and settings for an application.

Further, computer 1702 can be enable with a security module, such as a trusted processing module (TPM). For instance with a TPM, boot components hash next in time boot components, and wait for a match of results to secured values, before loading a next boot component. This process can take place at any layer in the code execution stack of computer 1702, e.g., applied at the application execution level or at the operating system (OS) kernel level, thereby enabling security at any level of code execution.

A user can enter commands and information into the computer 1702 through one or more wired/wireless input devices, e.g., a keyboard 1738, a touch screen 1740, and a pointing device, such as a mouse 1742. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1704 through an input device interface 1744 that can be coupled to the system bus 1708, but can be connected by other interfaces, such as a parallel port, an IEEE 1394 serial port, a game port, a USB port, an IR interface, a BLUETOOTH® interface, etc.

A monitor 1746 or other type of display device can be also connected to the system bus 1708 via an interface, such as a video adapter 1748. In addition to the monitor 1746, a computer typically includes other peripheral output devices (not shown), such as speakers, printers, etc.

The computer 1702 can operate in a networked environment using logical connections via wired and/or wireless communications to one or more remote computers, such as a remote computer(s) 1750. The remote computer(s) 1750 can be a workstation, a server computer, a router, a personal computer, portable computer, microprocessor-based entertainment appliance, a peer device or other common network node, and typically includes many or all of the elements described relative to the computer 1702, although, for purposes of brevity, only a memory/storage device 1752 is illustrated. The logical connections depicted include wired/wireless connectivity to a local area network (LAN) 1754 and/or larger networks, e.g., a wide area network (WAN) 1756. Such LAN and WAN networking environments are commonplace in offices and companies, and facilitate enterprise-wide computer networks, such as intranets, all of which can connect to a global communications network, e.g., the Internet.

When used in a LAN networking environment, the computer 1702 can be connected to the local network 1754 through a wired and/or wireless communication network interface or adapter 1758. The adapter 1758 can facilitate wired or wireless communication to the LAN 1754, which can also include a wireless access point (AP) disposed thereon for communicating with the adapter 1758 in a wireless mode.

When used in a WAN networking environment, the computer 1702 can include a modem 1760 or can be connected to a communications server on the WAN 1756 via other means for establishing communications over the WAN 1756, such as by way of the Internet. The modem 1760, which can be internal or external and a wired or wireless device, can be connected to the system bus 1708 via the input device interface 1744. In a networked environment, program modules depicted relative to the computer 1702 or portions thereof, can be stored in the remote memory/storage device 1752. It will be appreciated that the network connections shown are example and other means of establishing a communications link between the computers can be used.

When used in either a LAN or WAN networking environment, the computer 1702 can access cloud storage systems or other network-based storage systems in addition to, or in place of, external storage devices 1716 as described above, such as but not limited to a network virtual machine providing one or more aspects of storage or processing of information. Generally, a connection between the computer 1702 and a cloud storage system can be established over a LAN 1754 or WAN 1756 e.g., by the adapter 1758 or modem 1760, respectively. Upon connecting the computer 1702 to an associated cloud storage system, the external storage interface 1726 can, with the aid of the adapter 1758 and/or modem 1760, manage storage provided by the cloud storage system as it would other types of external storage. For instance, the external storage interface 1726 can be configured to provide access to cloud storage sources as if those sources were physically connected to the computer 1702.

The computer 1702 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 18:
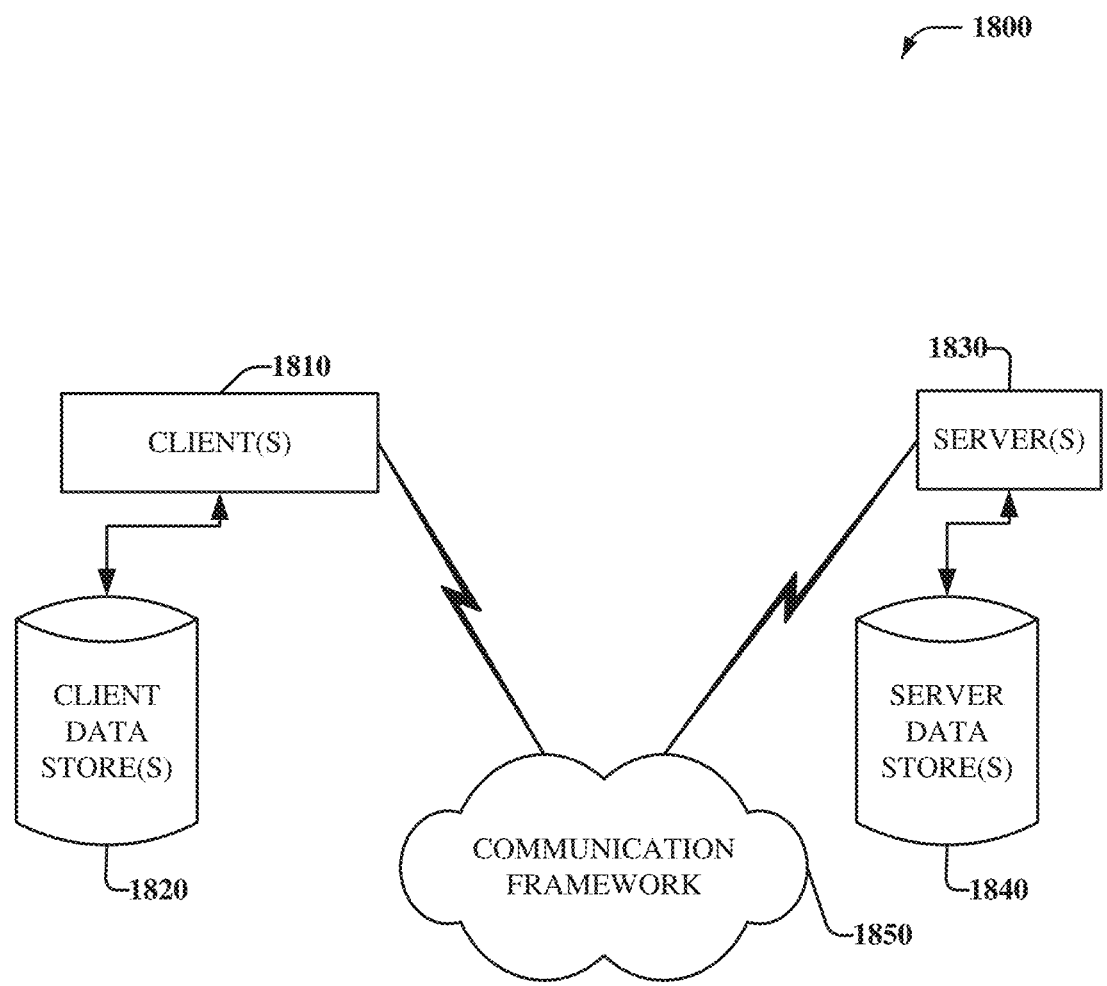
FIG. 18 illustrates an example networking environment operable to execute various implementations described herein.

FIG. 18 is a schematic block diagram of a sample computing environment 1800 with which the disclosed subject matter can interact. The sample computing environment 1800 includes one or more client(s) 1810. The client(s) 1810 can be hardware and/or software (e.g., threads, processes, computing devices). The sample computing environment 1800 also includes one or more server(s) 1830. The server(s) 1830 can also be hardware and/or software (e.g., threads, processes, computing devices). The servers 1830 can house threads to perform transformations by employing one or more embodiments as described herein, for example. One possible communication between a client 1810 and a server 1830 can be in the form of a data packet adapted to be transmitted between two or more computer processes. The sample computing environment 1800 includes a communication framework 1850 that can be employed to facilitate communications between the client(s) 1810 and the server(s) 1830. The client(s) 1810 are operably connected to one or more client data store(s) 1820 that can be employed to store information local to the client(s) 1810. Similarly, the server(s) 1830 are operably connected to one or more server data store(s) 1840 that can be employed to store information local to the servers 1830.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further aspects of various embodiments of the subject claimed innovation are provided in the subject matter that follows:

1. A system, comprising: a processor that executes computer-executable components stored in a computer-readable memory, the computer-executable components comprising: a receiver component that accesses a first set of data candidates and a second set of data candidates, wherein a machine learning model is trained on the first set of data candidates; an activation component that obtains a first set of latent activations generated by the machine learning model based on the first set of data candidates, and that obtains a second set of latent activations generated by the machine learning model based on the second set of data candidates; a compression component that generates a first set of compressed data points by applying a dimensionality reduction technique to the first set of latent activations, and that generates a second set of compressed data points by applying the dimensionality reduction technique to the second set of latent activations; and a diversity component that computes a diversity score based on the first set of compressed data points and the second set of compressed data points.

2. The system of any preceding clause, wherein the computer-executable components further comprise: a visualization component that renders a graph depicting the first set of compressed data points and the second set of compressed data points.

3. The system of any preceding clause, wherein a given compressed data point that is plotted on the graph corresponds to a given data candidate from the first set of data candidates or the second set of data candidates, wherein the given compressed data point is clickable as plotted on the graph, and wherein the visualization component renders the given data candidate in response to the given compressed data point being clicked.

4. The system of any preceding clause, wherein the second set of data candidates represents augmented versions of the first set of data candidates or otherwise represents potential training data for the machine learning model, and wherein the computer-executable components further comprise: an execution component that recommends training the machine learning model on the second set of data candidates in response to a determination that the diversity score satisfies a predetermined threshold, and that recommends not training the machine learning model on the second set of data candidates in response to a determination that the diversity score fails to satisfy the predetermined threshold.

5. The system of any preceding clause, wherein the second set of data candidates is unannotated, and wherein the computer-executable components further comprise: an execution component that identifies one or more outlying compressed data points in the second set of compressed data points, by comparing the second set of compressed data points to the first set of compressed data points, and that recommends that one or more data candidates from the second set of data candidates which correspond to the one or more outlying compressed data points be manually annotated.

6. The system of any preceding clause, wherein the second set of data candidates is unannotated, and wherein the computer-executable components further comprise: an execution component that identifies one or more non-outlying compressed data points in the second set of compressed data points, by comparing the second set of compressed data points to the first set of compressed data points, and that recommends that one or more data candidates from the second set of data candidates which correspond to the one or more non-outlying compressed data points be automatically annotated.

7. The system of any preceding clause, wherein the dimensionality reduction technique is a t-distributed stochastic neighbor embedding (tSNE) technique or a uniform manifold approximation and projection (UMAP) technique.

8. A computer-implemented method, comprising: accessing, by a device operatively coupled to a processor, a first set of data candidates and a second set of data candidates, wherein a machine learning model is trained on the first set of data candidates; obtaining, by the device, a first set of latent activations generated by the machine learning model based on the first set of data candidates, and obtaining, by the device, a second set of latent activations generated by the machine learning model based on the second set of data candidates; generating, by the device, a first set of compressed data points by applying a dimensionality reduction technique to the first set of latent activations, and generating, by the device, a second set of compressed data points by applying the dimensionality reduction technique to the second set of latent activations; and computing, by the device, a diversity score based on the first set of compressed data points and the second set of compressed data points.

9. The computer-implemented method of any preceding clause, further comprising: rendering, by the device, a graph depicting the first set of compressed data points and the second set of compressed data points.

10. The computer-implemented method of any preceding clause, wherein a given compressed data point that is plotted on the graph corresponds to a given data candidate from the first set of data candidates or the second set of data candidates, wherein the given compressed data point is clickable as plotted on the graph, and further comprising: rendering, by the device, the given data candidate in response to the given compressed data point being clicked.

11. The computer-implemented method of any preceding clause, wherein the second set of data candidates represents augmented versions of the first set of data candidates or otherwise represents potential training data for the machine learning model, and further comprising: recommending, by the device, that the machine learning model be trained on the second set of data candidates in response to a determination that the diversity score satisfies a predetermined threshold; and recommending, by the device, that the machine learning model not be trained on the second set of data candidates in response to a determination that the diversity score fails to satisfy the predetermined threshold.

12. The computer-implemented method of any preceding clause, wherein the second set of data candidates is unannotated, and further comprising: identifying, by the device, one or more outlying compressed data points in the second set of compressed data points, by comparing the second set of compressed data points to the first set of compressed data points; and recommending, by the device, that one or more data candidates from the second set of data candidates which correspond to the one or more outlying compressed data points be manually annotated.

13. The computer-implemented method of any preceding clause, wherein the second set of data candidates is unannotated, and further comprising: identifying, by the device, one or more non-outlying compressed data points in the second set of compressed data points, by comparing the second set of compressed data points to the first set of compressed data points; and recommending, by the device, that one or more data candidates from the second set of data candidates which correspond to the one or more non-outlying compressed data points be automatically annotated.

14. The computer-implemented method of any preceding clause, wherein the dimensionality reduction technique is a t-distributed stochastic neighbor embedding (tSNE) technique or a uniform manifold approximation and projection (UMAP) technique.

15. A computer program product for facilitating data diversity visualization and quantification for machine learning models, the computer program product comprising a computer-readable memory having program instructions embodied therewith, the program instructions executable by a processor to cause the processor to: access a first set of data candidates and a second set of data candidates, wherein a machine learning model is trained on the first set of data candidates; obtain a first set of latent activations generated by the machine learning model based on the first set of data candidates, and obtain a second set of latent activations generated by the machine learning model based on the second set of data candidates; generate a first set of compressed data points by applying a dimensionality reduction technique to the first set of latent activations, and generate a second set of compressed data points by applying the dimensionality reduction technique to the second set of latent activations; and compute a diversity score based on the first set of compressed data points and the second set of compressed data points.

16. The computer program product of any preceding clause, wherein the program instructions are further executable to cause the processor to: render a graph depicting the first set of compressed data points and the second set of compressed data points.

17. The computer program product of any preceding clause, wherein a given compressed data point that is plotted on the graph corresponds to a given data candidate from the first set of data candidates or the second set of data candidates, wherein the given compressed data point is clickable as plotted on the graph, and wherein the processor renders the given data candidate in response to the given compressed data point being clicked.

18. The computer program product of any preceding clause, wherein the second set of data candidates represents augmented versions of the first set of data candidates or otherwise represents potential training data for the machine learning model, and wherein the program instructions are further executable to cause the processor to: recommend training the machine learning model on the second set of data candidates in response to a determination that the diversity score satisfies a predetermined threshold; and recommend not training the machine learning model on the second set of data candidates in response to a determination that the diversity score fails to satisfy the predetermined threshold.

19. The computer program product of any preceding clause, wherein the second set of data candidates is unannotated, and wherein the program instructions are further executable to cause the processor to: identify one or more outlying compressed data points in the second set of compressed data points, by comparing the second set of compressed data points to the first set of compressed data points; and recommend that one or more data candidates from the second set of data candidates which correspond to the one or more outlying compressed data points be manually annotated.

20. The computer program product of any preceding clause, wherein the second set of data candidates is unannotated, and wherein the program instructions are further executable to cause the processor to: identify one or more non-outlying compressed data points in the second set of compressed data points, by comparing the second set of compressed data points to the first set of compressed data points; and recommend that one or more data candidates from the second set of data candidates which correspond to the one or more non-outlying compressed data points be automatically annotated.

What is claimed is:

1. A system, comprising:
a memory that stores computer-executable components; and
a processor that executes at least one of the computer-executable components that:
accesses a first set of data candidates and a second set of data candidates, wherein a machine learning model is trained on the first set of data candidates, wherein the second set of data candidates represents at least one of augmented versions of the first set of data candidates or potential training data for the machine learning model;
obtains a first set of latent activations generated by the machine learning model based on the first set of data candidates;
obtains a second set of latent activations generated by the machine learning model based on the second set of data candidates;
generates a first set of compressed data points in a defined space by applying a dimensionality reduction technique to the first set of latent activations;
generates a second set of compressed data points in the defined space by applying the dimensionality reduction technique to the second set of latent activations;
generates a diversity score based on the first set of compressed data points and the second set of compressed data points, wherein the diversity score represents a degree of diversity of the second set of compressed data points from the first set of compressed data points from a perspective of the machine learning model, and wherein generating the diversity score comprises:
grouping compressed data points of the first set of compressed data points into clusters,
for each cluster, determining a respective threshold distance in the defined space from a center of the cluster based on a density of compressed data points in the cluster and a distribution of compressed data points in the cluster,
assigning compressed data points of the second set of compressed data points into the clusters based on a defined criterion, and
determining the diversity score based on an amount of respective compressed data points of the second set of compressed data points in the defined space that are outside of the respective threshold distances from the respective centers of the clusters assigned to the respective compressed data points of the second set of compressed data points;

recommends training the machine learning model on the second set of data candidates in response to determining that the diversity score satisfies a predetermined threshold; and recommends not training the machine learning model on the second set of data candidates in response to determining that the diversity score fails to satisfy the predetermined threshold.

2. The system of claim 1, wherein the at least one of the computer-executable components further:

renders a graph depicting the first set of compressed data points and the second set of compressed data points.

3. The system of claim 2, wherein a given compressed data point that is plotted on the graph corresponds to a given data candidate from the first set of data candidates or the second set of data candidates, wherein the given compressed data point is clickable as plotted on the graph, and wherein the at least one of the computer-executable components further:

renders the given data candidate in response to the given compressed data point being clicked.

4. The system of claim 1, wherein the second set of data candidates is unannotated, and wherein the at least one of the computer-executable components further:

recommends that one or more data candidates from the second set of data candidates which correspond to one or more of the respective compressed data points of the second set of compressed data points that are outside of the respective threshold distances be manually annotated.

5. The system of claim 1, wherein the second set of data candidates is unannotated, and wherein the at least one of the computer-executable components further:

recommends that one or more data candidates from the second set of data candidates which do not correspond to any of the respective compressed data points of the second set of compressed data points that are outside of the respective threshold distances be automatically annotated.

6. The system of claim 1, wherein the dimensionality reduction technique is a t-distributed stochastic neighbor embedding (tSNE) technique or a uniform manifold approximation and projection (UMAP) technique.

7. The system of claim 1, wherein the at least one of the computer-executable components further:

in response to recommending training the machine learning model on the second set of data candidates, retraining the machine learning model using the second set of data candidates.

8. A computer-implemented method, comprising:

accessing, by a device operatively coupled to a processor, a first set of data candidates and a second set of data candidates, wherein a machine learning model is trained on the first set of data candidates, wherein the second set of data candidates represents at least one of augmented versions of the first set of data candidates or potential training data for the machine learning model;

obtaining, by the device, a first set of latent activations generated by the machine learning model based on the first set of data candidates;

obtaining, by the device, a second set of latent activations generated by the machine learning model based on the second set of data candidates;

generating, by the device, a first set of compressed data points in a defined space by applying a dimensionality reduction technique to the first set of latent activations;

generating, by the device, a second set of compressed data points in the defined space by applying the dimensionality reduction technique to the second set of latent activations;

generating, by the device, a diversity score based on the first set of compressed data points and the second set of compressed data points, wherein the diversity score represents a degree of diversity of the second set of compressed data points from the first set of compressed data points from a perspective of the machine learning model, and wherein generating the diversity score comprises:

grouping compressed data points of the first set of compressed data points into clusters, for each cluster, determining a respective threshold distance in the defined space from a center of the cluster based on a density of compressed data points in the cluster and a distribution of compressed data points in the cluster, assigning compressed data points of the second set of compressed data points into the clusters based on a defined criterion, and determining the diversity score based on an amount of respective compressed data points of the second set of compressed data points in the defined space that are outside of the respective threshold distances from the respective centers of the clusters assigned to the respective compressed data points of the second set of compressed data points;

recommending, by the device, training the machine learning model on the second set of data candidates in response to determining that the diversity score satisfies a predetermined threshold; and recommending, by the device, not training the machine learning model on the second set of data candidates in response to determining that the diversity score fails to satisfy the predetermined threshold.

9. The computer-implemented method of claim 8, further comprising:

rendering, by the device, a graph depicting the first set of compressed data points and the second set of compressed data points.

10. The computer-implemented method of claim 9, wherein a given compressed data point that is plotted on the graph corresponds to a given data candidate from the first set of data candidates or the second set of data candidates, wherein the given compressed data point is clickable as plotted on the graph, and further comprising:

rendering, by the device, the given data candidate in response to the given compressed data point being clicked.

11. The computer-implemented method of claim 8, wherein the second set of data candidates is unannotated, and further comprising:

recommending, by the device, that one or more data candidates from the second set of data candidates which correspond to one or more of the respective compressed data points of the second set of compressed data points that are outside of the respective threshold distances be manually annotated.

12. The computer-implemented method of claim 8, wherein the second set of data candidates is unannotated, and further comprising:

recommending, by the device, that one or more data candidates from the second set of data candidates which do not correspond to any of the respective compressed data points of the second set of compressed data points that are outside of the respective threshold distances be automatically annotated.

13. The computer-implemented method of claim 8, wherein the dimensionality reduction technique is a t-distributed stochastic neighbor embedding (tSNE) technique or a uniform manifold approximation and projection (UMAP) technique.

14. The computer-implemented method of claim 8, wherein the second set of data candidates is unannotated, and further comprising:
   in response to recommending training the machine learning model on the second set of data candidates, retraining, by the device, the machine learning model using the second set of data candidates.

15. A computer program product for facilitating data diversity visualization and quantification for machine learning models, the computer program product comprising a non-transitory computer-readable medium having program instructions embodied therewith, the program instructions executable by a processor to cause the processor to:
   access a first set of data candidates and a second set of data candidates, wherein a machine learning model is trained on the first set of data candidates, wherein the second set of data candidates represents at least one of augmented versions of the first set of data candidates or potential training data for the machine learning model;
   obtain a first set of latent activations generated by the machine learning model based on the first set of data candidates;
   obtain a second set of latent activations generated by the machine learning model based on the second set of data candidates;
   generate a first set of compressed data points in a defined space by applying a dimensionality reduction technique to the first set of latent activations;
   generate a second set of compressed data points in the defined space by applying the dimensionality reduction technique to the second set of latent activations;
   generate a diversity score based on the first set of compressed data points and the second set of compressed data points, wherein the diversity score represents a degree of diversity of the second set of compressed data points from the first set of compressed data points from a perspective of the machine learning model, and wherein generating the diversity score comprises:
      grouping compressed data points of the first set of compressed data points into clusters,
      for each cluster, determining a respective threshold distance in the defined space from a center of the cluster based on a density of compressed data points in the cluster and a distribution of compressed data points in the cluster,
      assigning compressed data points of the second set of compressed data points into the clusters based on a defined criterion, and
      determining the diversity score based on an amount of respective compressed data points of the second set of compressed data points in the defined space that are outside of the respective threshold distances from the respective centers of the clusters assigned to the respective compressed data points of the second set of compressed data points;
   recommend training the machine learning model on the second set of data candidates in response to determining that the diversity score satisfies a predetermined threshold; and
   recommend not training the machine learning model on the second set of data candidates in response to determining that the diversity score fails to satisfy the predetermined threshold.

16. The computer program product of claim 15, wherein the program instructions are further executable to cause the processor to:
   render a graph depicting the first set of compressed data points and the second set of compressed data points.

17. The computer program product of claim 16, wherein a given compressed data point that is plotted on the graph corresponds to a given data candidate from the first set of data candidates or the second set of data candidates, wherein the given compressed data point is clickable as plotted on the graph, and wherein the processor renders the given data candidate in response to the given compressed data point being clicked.

18. The computer program product of claim 15, wherein the second set of data candidates is unannotated, and wherein the program instructions are further executable to cause the processor to:
   recommend that one or more data candidates from the second set of data candidates which correspond to one or more of the respective compressed data points of the second set of compressed data points that are outside of the respective threshold distances be manually annotated.

19. The computer program product of claim 15, wherein the second set of data candidates is unannotated, and wherein the program instructions are further executable to cause the processor to:
   identify one or more non-outlying compressed data points in the second set of compressed data points, by comparing the second set of compressed data points to the first set of compressed data points; and
   recommend that one or more data candidates from the second set of data candidates which do not correspond to any of the respective compressed data points of the second set of compressed data points that are outside of the respective threshold distances be automatically annotated.

20. The computer program product of claim 15, wherein the dimensionality reduction technique is a t-distributed stochastic neighbor embedding (tSNE) technique or a uniform manifold approximation and projection (UMAP) technique.

* * * * *